(12) United States Patent
Kronseder et al.

(10) Patent No.: US 7,810,629 B2
(45) Date of Patent: Oct. 12, 2010

(54) DEVICE FOR DYNAMIC STORAGE OF OBJECTS

(75) Inventors: Volker Kronseder, Neutraubling (DE); Heinz Humele, Thalmassing (DE); Wolfgang Hausladen, Motzing (DE); Alexander Kaiser, Rain (DE)

(73) Assignee: Krones AG, Neutraubling (DE)

( * ) Notice: Subject to any disclaimer, the term of this patent is extended or adjusted under 35 U.S.C. 154(b) by 307 days.

(21) Appl. No.: 10/588,046

(22) PCT Filed: Feb. 1, 2005

(86) PCT No.: PCT/EP2005/000942

§ 371 (c)(1),
(2), (4) Date: Nov. 16, 2006

(87) PCT Pub. No.: WO2005/073113

PCT Pub. Date: Aug. 11, 2005

(65) Prior Publication Data

US 2008/0142336 A1    Jun. 19, 2008

(30) Foreign Application Priority Data

| Feb. 2, 2004 | (DE) | 10 2004 005 180 |
| Sep. 8, 2004 | (DE) | 10 2004 043 791 |
| Nov. 3, 2004 | (DE) | 10 2004 053 663 |

(51) Int. Cl.
   *B65G 1/00*    (2006.01)
(52) U.S. Cl. ........ 198/347.1; 198/594; 198/460.2; 198/470.1; 198/850; 198/803.3
(58) Field of Classification Search .......... None
   See application file for complete search history.

(56) References Cited

U.S. PATENT DOCUMENTS 1,810,419 A  *  6/1931  Francis .................. 198/687

(Continued)

FOREIGN PATENT DOCUMENTS

CA    2364216    6/2003

(Continued)

OTHER PUBLICATIONS

Dynac Model 6400 Series General Specificatiosn Brochure, 2002, Hartness International, Greenville, SC, US (2 pp.).

(Continued)

*Primary Examiner*—Gene Crawford
*Assistant Examiner*—William R Harp
(74) *Attorney, Agent, or Firm*—Marshall, Gerstein & Borun LLP

(57) ABSTRACT

A device for dynamic storage of objects along a conveying section between an input station and an output station with an endless, flexible conveying means, which is variably subdivided into a conveying strand and an idle strand, with at least one carriage, which can be moved in the plane of conveyance, for changing the storage capacity, which carriage presents a first deflection for the conveying strand and a second deflection for the idle strand, as well as with a first drive device for the conveying means in the area of the input station and a second drive device for the conveying means in the area of the output station. The conveying means is provided over its entire length at identical intervals with grippers for the objects and the conveying means has a link chain, equipped with rotatable guide rollers, which runs at least in some areas in at least one stationary guide rail, where at least one guide roller is arranged on the respective chain link in a movable manner.

43 Claims, 22 Drawing Sheets

U.S. PATENT DOCUMENTS

| | | | |
|---|---|---|---|
| 2,788,140 A | | 4/1957 | Becker |
| 3,297,138 A | | 1/1967 | McCombie |
| 3,575,282 A | * | 4/1971 | Gaiotto et al. ............... 198/683 |
| 3,664,487 A | | 5/1972 | Ballenger |
| 3,968,861 A | | 7/1976 | Kernen et al. |
| 4,018,325 A | | 4/1977 | Rejsa |
| 4,153,858 A | | 5/1979 | Schylander et al. |
| 4,269,299 A | | 5/1981 | Goodman, Jr. |
| 4,294,345 A | * | 10/1981 | Stauber et al. ............... 198/683 |
| 4,399,909 A | | 8/1983 | Gorelik |
| 4,413,724 A | | 11/1983 | Fellner |
| 4,468,277 A | * | 8/1984 | Kontz ............................ 156/567 |
| 4,469,219 A | | 9/1984 | Cosse et al. |
| 4,513,858 A | | 4/1985 | Fellner et al. ............... 198/812 |
| 4,549,647 A | | 10/1985 | Crosse |
| 4,565,284 A | | 1/1986 | Seragnoli et al. |
| 4,838,410 A | * | 6/1989 | Gough ........................ 198/706 |
| 4,903,823 A | * | 2/1990 | Plesser et al. ................. 198/845 |
| 4,982,944 A | * | 1/1991 | Eberle .......................... 271/204 |
| 4,989,718 A | | 2/1991 | Steeber |
| 5,022,609 A | | 6/1991 | Cranston |
| 5,076,422 A | * | 12/1991 | Clopton .................... 198/838 |
| 5,129,506 A | * | 7/1992 | Gutov et al. ................. 198/712 |
| 5,191,959 A | * | 3/1993 | Leemkuil ............... 198/370.02 |
| 5,413,213 A | | 5/1995 | Golz et al. |
| 5,429,227 A | | 7/1995 | Krossmann et al. |
| 5,490,589 A | | 2/1996 | Golz et al. |
| 5,620,084 A | | 4/1997 | Mensch |
| 5,645,159 A | * | 7/1997 | Luginbuhl et al. .......... 198/838 |
| 5,722,655 A | | 3/1998 | Reist |
| 5,772,005 A | * | 6/1998 | Hansch ....................... 198/594 |
| 5,863,571 A | * | 1/1999 | Santais et al. ................ 425/526 |
| 5,996,322 A | | 12/1999 | La Barre |
| 6,079,541 A | * | 6/2000 | Bercelli et al. ......... 198/377.03 |
| 6,119,848 A | | 9/2000 | Hartness, III et al. |
| 6,152,291 A | * | 11/2000 | Steeber et al. ............... 198/594 |
| 6,168,004 B1 | | 1/2001 | Drewitz et al. |
| 6,182,812 B1 | | 2/2001 | Hartness, III et al. |
| 6,209,716 B1 | | 4/2001 | Bogle et al. |
| 6,230,874 B1 | * | 5/2001 | Steeber et al. ............... 198/602 |
| 6,241,074 B1 | * | 6/2001 | Steeber ........................ 198/456 |
| 6,260,688 B1 | * | 7/2001 | Steeber et al. ........... 198/347.4 |
| 6,334,528 B1 | | 1/2002 | Bogle et al. |
| 6,354,427 B1 | * | 3/2002 | Pickel et al. ............. 198/470.1 |
| 6,382,398 B2 | * | 5/2002 | Steeber et al. ............... 198/594 |
| 6,394,260 B1 | * | 5/2002 | Barth et al. .................. 198/799 |
| 6,446,781 B1 | | 9/2002 | De Villele |
| 6,497,321 B2 | | 12/2002 | Horton et al. |
| 6,520,318 B1 | | 2/2003 | Humele |
| 6,523,669 B1 | * | 2/2003 | Steeber et al. ......... 198/370.01 |
| 6,533,103 B2 | * | 3/2003 | Hartness et al. ............. 198/594 |
| 6,550,602 B2 | * | 4/2003 | Steeber et al. ........... 198/347.4 |
| 6,585,104 B2 | | 7/2003 | Horton et al. |
| 6,591,963 B2 | * | 7/2003 | Wipf ....................... 198/347.2 |
| 6,601,697 B2 | | 8/2003 | Steeber et al. |
| 6,612,420 B1 | | 9/2003 | Hartness, III et al. |
| 6,662,936 B2 | | 12/2003 | Ikemoto et al. |
| 6,698,581 B2 | * | 3/2004 | Steeber et al. ............... 198/602 |
| 6,725,997 B2 | * | 4/2004 | Draghetti ................. 198/347.1 |
| 6,725,998 B2 | * | 4/2004 | Steeber et al. ........... 198/347.4 |
| 6,761,264 B2 | | 7/2004 | Steeber et al. |
| 6,779,651 B1 | * | 8/2004 | Linglet et al. ............. 198/803.9 |
| 6,817,464 B2 | * | 11/2004 | Biondi et al. ............. 198/347.1 |
| 6,846,145 B2 | * | 1/2005 | Remericq .............. 414/331.04 |
| 6,848,563 B2 | | 2/2005 | Abert et al. |
| 6,896,120 B2 | * | 5/2005 | Barry et al. ................. 198/367 |
| 6,959,953 B2 | * | 11/2005 | Graffin ....................... 294/104 |
| 6,973,767 B2 | * | 12/2005 | Wagner et al. ................. 53/544 |
| 7,021,452 B2 | | 4/2006 | Horton et al. |
| 7,032,742 B2 | * | 4/2006 | Hartness et al. ............. 198/594 |
| 7,140,870 B2 | * | 11/2006 | Nava .......................... 425/534 |
| 7,191,896 B2 | * | 3/2007 | Hartness et al. ............. 198/594 |
| 7,219,788 B2 | * | 5/2007 | Tuck et al. ................ 198/347.2 |
| 7,264,113 B2 | * | 9/2007 | Hartness et al. ............. 198/850 |
| 7,278,531 B2 | * | 10/2007 | Hartness et al. ........... 198/470.1 |
| 7,299,832 B2 | * | 11/2007 | Hartness et al. ............. 141/144 |
| 7,311,515 B2 | * | 12/2007 | Netsu ........................... 425/534 |
| 7,331,156 B2 | * | 2/2008 | Hartness et al. ................ 53/251 |
| 7,334,677 B2 | * | 2/2008 | Mader ........................ 198/850 |
| 7,413,072 B2 | * | 8/2008 | Horton et al. ............... 198/594 |
| 7,431,142 B2 | * | 10/2008 | Eberle ....................... 198/465.4 |
| 7,442,031 B2 | * | 10/2008 | Netsu ........................ 425/526 |
| 2002/0053499 A1 | * | 5/2002 | Zurcher ...................... 198/850 |
| 2002/0144880 A1 | | 10/2002 | Ikemoto et al. |
| 2002/0195317 A1 | | 12/2002 | Wipf |
| 2003/0085103 A1 | | 5/2003 | Horton et al. |
| 2003/0155212 A1 | | 8/2003 | Abert et al. |
| 2007/0235288 A1 | * | 10/2007 | Horton et al. .......... 198/457.05 |
| 2008/0142336 A1 | | 6/2008 | Kronseder et al. |
| 2008/0210520 A1 | * | 9/2008 | Legallais ................. 198/470.1 |
| 2008/0223691 A1 | * | 9/2008 | Nishi et al. ............... 198/470.1 |

FOREIGN PATENT DOCUMENTS

| | | |
|---|---|---|
| DE | 1080580 | 4/1960 |
| DE | 2610833 | 9/1977 |
| DE | 2618905 | 11/1977 |
| DE | 19824846 | 12/1999 |
| DE | 19928325 | 12/2000 |
| DE | 29913237 | 12/2000 |
| DE | 102004053663 | 8/2005 |
| DE | 202006003690 | 6/2006 |
| DE | 102006012148 | 9/2007 |
| EP | 0506551 | 9/1992 |
| EP | 0581143 | 2/1994 |
| EP | 0 734 978 B1 | 10/1996 |
| EP | 1161391 | 12/2001 |
| EP | 1 275 603 B1 | 1/2003 |
| EP | 1 295 820 B1 | 3/2003 |
| EP | 1389595 | 2/2004 |
| EP | 1426313 | 6/2004 |
| EP | 1832533 | 9/2007 |
| FR | 2745804 | 9/1997 |
| FR | 2 766 803 | 2/1999 |
| GB | 1301843 | 1/1973 |
| GB | 2047667 | 12/1980 |
| GB | 2143788 | 2/1985 |
| GB | 2300613 | 11/1996 |
| JP | 61-197376 | 9/1986 |
| JP | 70-46977 | 2/1995 |
| RU | 2160694 | 12/2002 |
| RU | 2198835 | 2/2003 |
| WO | WO-97/09257 | 3/1997 |
| WO | WO-00/43294 | 7/2000 |
| WO | WO-01/10754 | 2/2001 |
| WO | WO-01/98187 | 12/2001 |
| WO | WO-02/072454 | 9/2002 |
| WO | WO-2005/073113 | 8/2005 |
| WO | WO-2007/025598 | 3/2007 |

OTHER PUBLICATIONS

Dynac 7000 Series General Specifications Brochure 2002, Hartness International, Greenville, SC, US (2 pp.).

Anonymous, "Paternoster", 7 pp., Retrieved from the Internet on Apr. 28, 2008: http://en.wikipedia.org/wiki/Paternoster.

Anonymous, "Paternoster lift, also known as the cyclic elevator", 3 pp., Retrieved from the Internet on Apr. 18, 2008: http:www.dartfordarchive.org/uk/technology/magnified/cyclic_elev.htm.

Dynac 6000 Series Brochure, Hartness International, Greenville, South Carolina, United States (2 pp.), understood to have been publicly available at least as early as Nov. 2, 2004.

Dynac Model 7000 Brochure, Hartness International, Greenville, South Carolina, United States (2 pp.), understood to have been publicly available at least as early as Nov. 2, 2004.

International Preliminary Report on Patentability for International Application No. PCT/EP2005/10747 (Apr. 24, 2007).

International Preliminary Report on Patentability for International Application No. PCT/EP2006/006648 (Apr. 15, 2008).

International Preliminary Report on Patentability for International Application No. PCT/EP2007/000485 (Nov. 4, 2008).

International Preliminary Report on Patentability for International Application No. PCT/EP2007/005824 (Feb. 17, 2009).

Written Opinion for International Application No. PCT/EP2005/010747 (Dec. 1, 2005).

Written Opinion for International Application No. PCT/EP2006/006648 (Sep. 25, 2006).

Written Opinion for International Application No. PCT/EP2007/000485 (May 7, 2007).

Written Opinion for International Application No. PCT/EP2007/005824 (Oct. 8, 2007).

International Search Report and Written Opinion for International Application No. PCT/EP2005/010747 (Nov. 21, 2005).

International Preliminary Report on Patentability for International Application No. PCT/EP2007/000485 (Nov. 4, 2008).

International Search Report and Written Opinion for International Application No. PCT/EP2005/000942 (Sep. 30, 2005).

International Preliminary Report on Patentability for International Application No. PCT/EP2005/000942 (Oct. 3, 2006).

International Search Report and Written Opinion for International Application No. PCT/EP2007/000305 (Apr. 19, 2007).

International Preliminary Report on Patentability for International Application No. PCT/EP2007/000305 (Oct. 14, 2008).

* cited by examiner

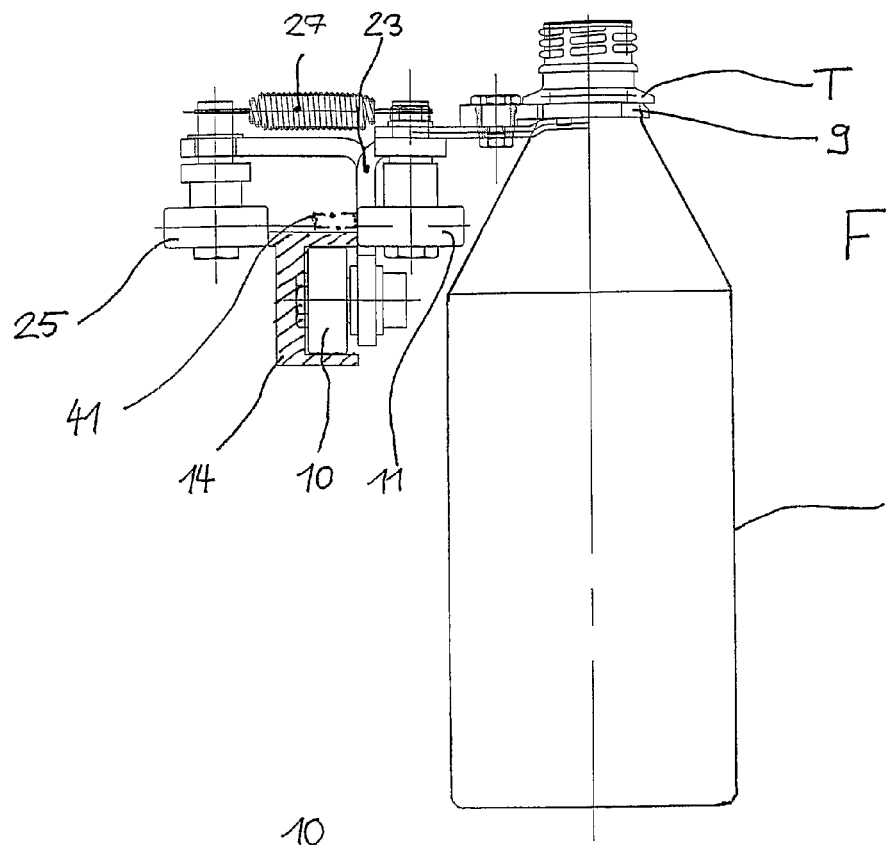
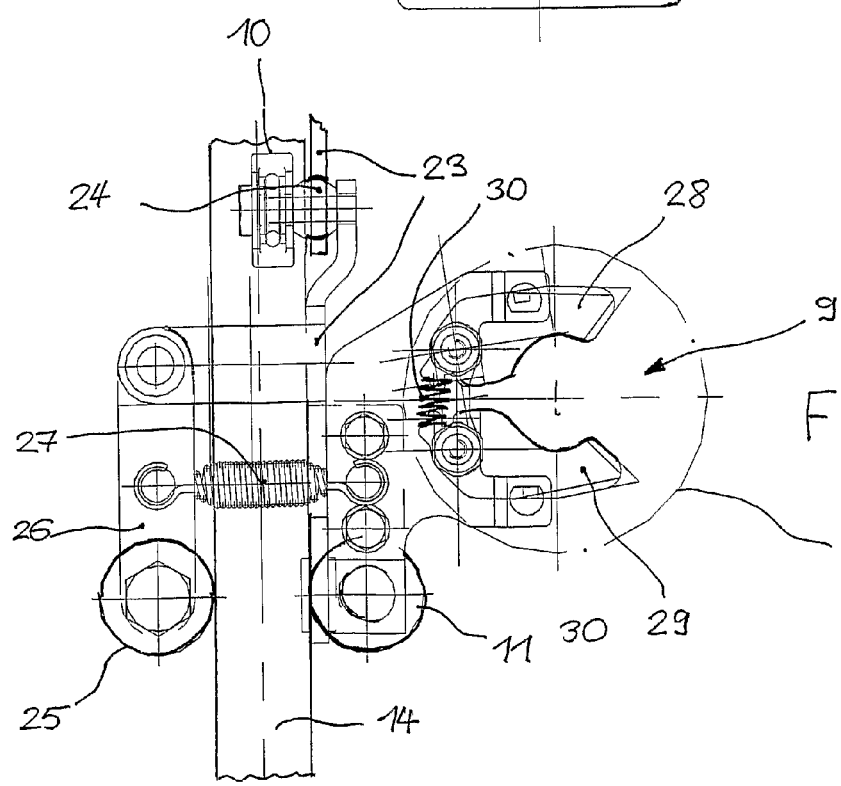

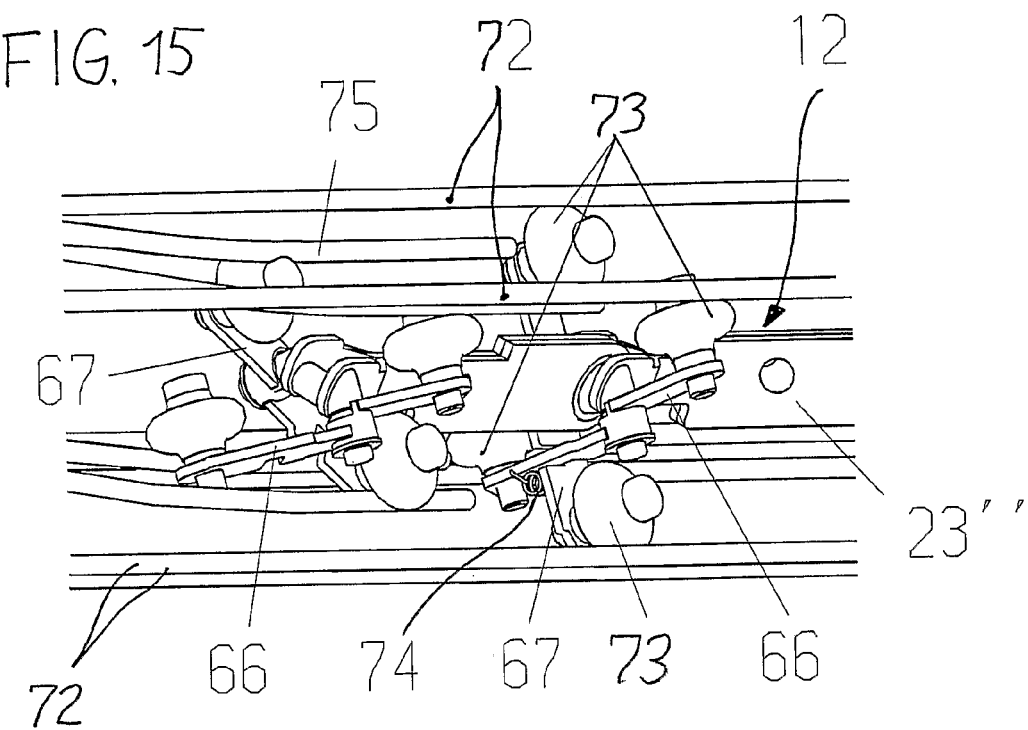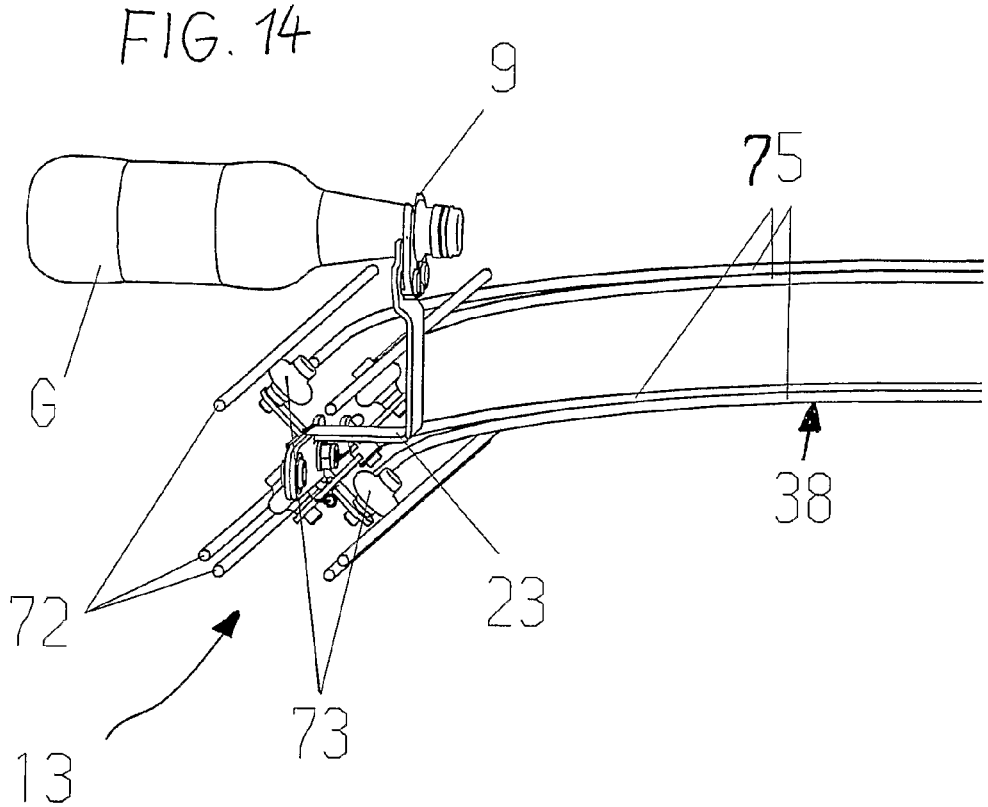

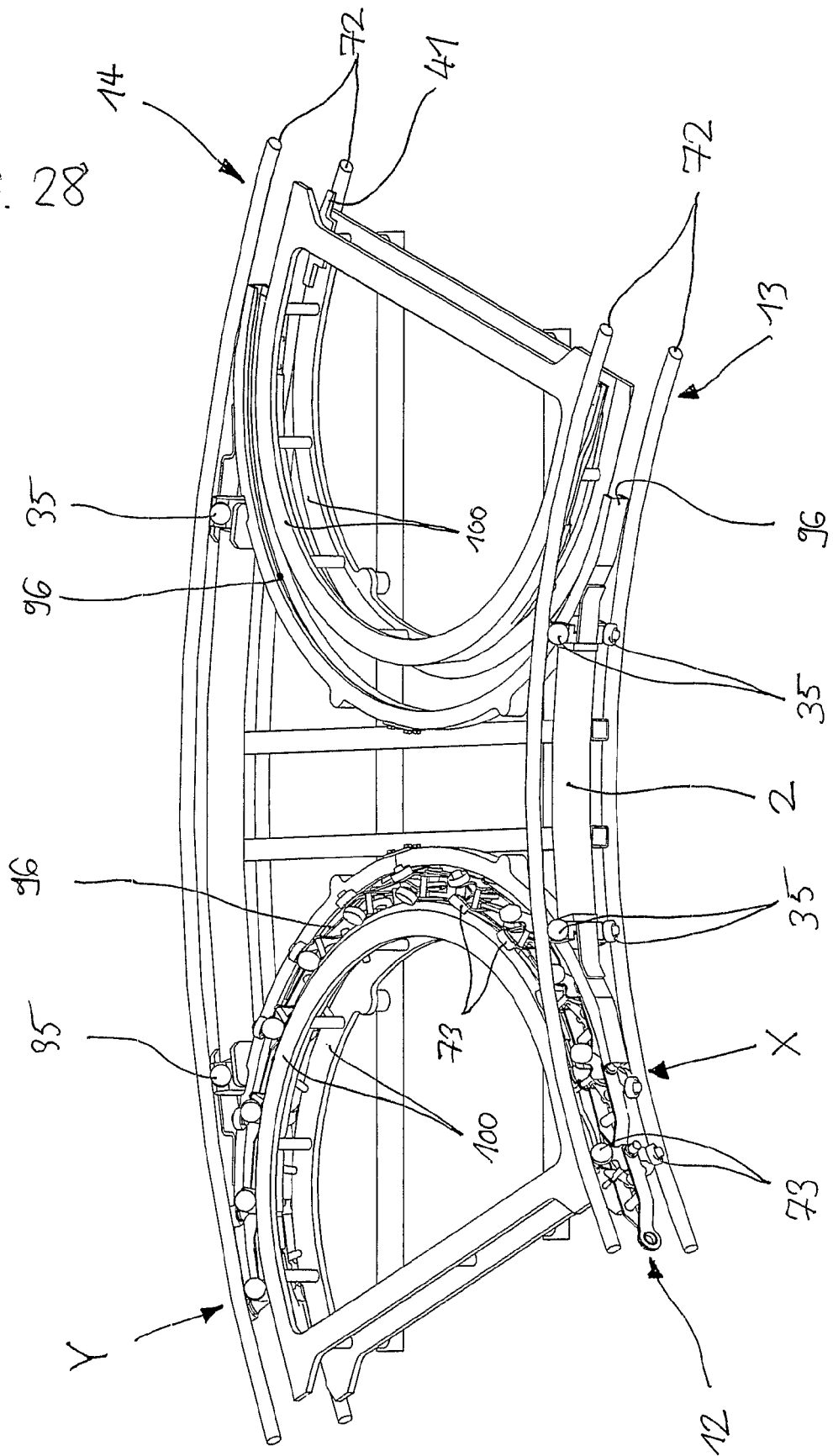

DEVICE FOR DYNAMIC STORAGE OF OBJECTS

CROSS-REFERENCE TO RELATED APPLICATION

This is the U.S. national stage under 35 U.S.C. § 371, of international application No. PCT/EP2005/000942, having an international filing date of Feb. 1, 2005, and claims priority to German application No. 10 2004 005 180.1 filed on Feb. 2, 2004, German application No. 10 2004 043 791.2 filed on Sep. 8, 2004, German application No. 10 2004 053 663.5 filed on Nov. 3, 2004.

FIELD OF THE INVENTION

The disclosure relates to a device for dynamic storage of objects.

BACKGROUND OF THE INVENTION

As is known, for example, from U.S. Pat. No. 4,413,724 or EP 1 275 603 A1, such a device, based on the continuous displacement capacity of the carriage in both directions, allows a rapid and finely tuned adaptation of the buffer capacity as a function of the conditions at the entry station and at the exit station and thus it makes it possible, for example, to dynamically couple two machines that can be operated with different outputs. It is characteristic here that all the objects that enter into the entry station or are removed from the exit station pass through the entire conveying section with variable length in each operating state, where the conveying section thus has simultaneously a transport and also a storage function. The positioning or the movement of the carriage is achieved automatically with the two drive devices for the conveying means, and the objects can remain on the conveying means during the transport from the entry station to the exit station without excess advance.

However, the deficient lateral guidance for the objects is a disadvantage, because the objects stand freely on the conveying means, particularly in areas of deflections. The known dynamic storage devices are consequently not suitable for the rapid transport of objects with low resistance to tipping, for example, empty plastic bottles.

In addition, the flexible conveying means of the known devices, which are formed by link chains, are received substantially with sliding motion in stationary guide rails, which results in a high degree of wear. To further complicate the situation, in EP 1 275 603, in the case of a spiral-shaped design of the variable conveying section, strong traction forces directed toward the interior of the arc of the link chains occur. In this known device, the link chain also must engage in the area of the deflections of the carriage with the stationary guide rails, against the tractions which act towards the interior of the arc. The presented solutions to lift the link chain by means of a rotating deflection disk or by lowering the guide element of the interior of the arc are not suitable for a practical continuous use with high conveyance output.

SUMMARY OF THE DISCLOSURE

The disclosure is based on the problem of achieving, by using a device according to the preamble for dynamic storage of objects and with simple means, a breakdown-free transport even of objects that are prone to tip over at a high speed, particularly in the case of a spiral- or coil-shaped design of the conveying section.

In a device according to the disclosure, no shifting, tipping over or similar movement of the objects is possible; such movements are reliably prevented by the grippers, which are capable of fixing the objects from the entry station to the exit station without circumferential gripping and without additional securing. The separation between the objects during their advance over the variable conveying section is always maintained with precision, so that the orientation of the objects is not changed as they pass through the device. The device according to the disclosure therefore can be connected, for example, directly to the outlet star of a first machine and the inlet star of a second machine. The dynamic buffer effect is consequently not affected in any manner and no additional object timing devices are required. In this manner, a controlled processing, removal by sorting, or multi-track distribution of the objects is also possible with the help of the conveying means.

Advantageous variants of the disclosure are provided, with the design of the flexible traction means and of the carriage particularly advantageous. The guide rollers allow a particularly force-saving, low-wear operation of the device, where the movable arrangement of certain guide rollers facilitates the disengagement and engagement of the conveying means from and into, respectively, the stationary guides. This design can also be used advantageously with conveying means for dynamic storage devices, which do not present any grippers for the objects, and also with a link chain for a dynamic storage device.

BRIEF DESCRIPTION OF THE DRAWINGS

Embodiment examples of the disclosure are described below with reference to the drawing. In the drawing:

FIG. 3 shows the cross section A B according to FIG. 2, FIG. 4 shows the top view C of FIG. 2, FIG. 14 shows perspective views of a conveying means FIG. 15 with scissor-like pivotable guide rollers

FIG. 28 shows a perspective view of the carriage for the conveying means according to FIGS. 24 and 25, partially without roller chain.

DETAILED DESCRIPTION OF THE DISCLOSURE

Figure 1:
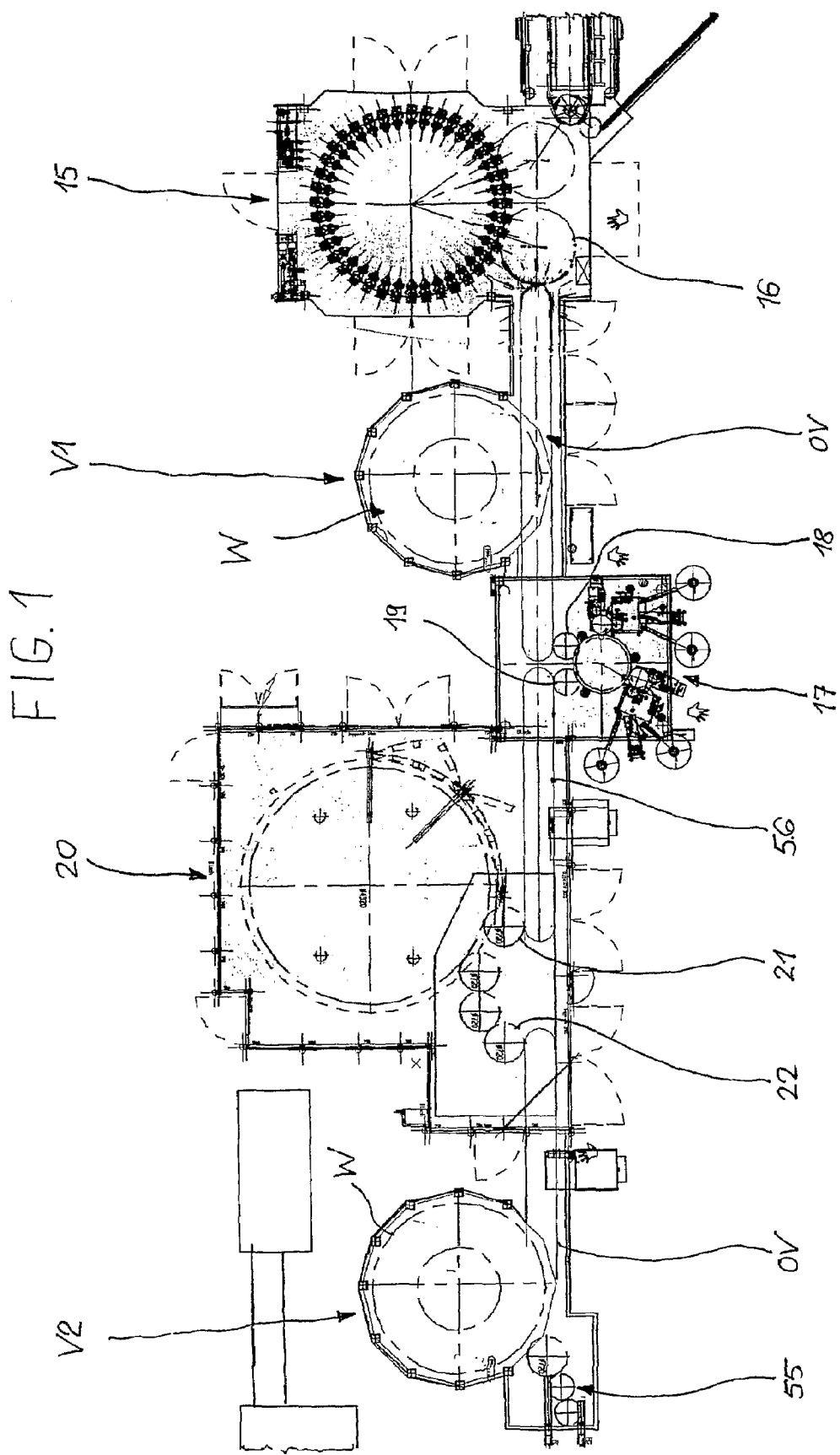
FIG. 1 shows the schematic top view of an installation for the manufacture and filling of PET bottles with two integrated dynamic storage devices.

The installation according to FIG. 1 is set up for the manufacture, labeling, filling, closing and packing of objects in the form of PET bottles for drinks, hereafter referred to in short as bottles G, which present a support ring T in the usual manner in the head area. The installation comprises a rotating stretching-blowing machine 15 with an outlet star 16, a rotating labeling machine 17 with an inlet star 18 and an outlet star 19, a rotating filling and closing machine 20 with an inlet star 21 and an outlet star 22, and a packaging machine which is not shown, all these parts being of a conventional construction type. Each machine presents its own motor—not shown—by means of which it can be driven continuously together with its star wheels at variable speed. Between the stretching-blowing machine 15 and the labeling machine 17, as well as between the filling and closing machine 20 and the packaging machine, which is not shown, a dynamic storage device V is arranged in each case. The first dynamic storage device $V_1$ transfers the empty bottles G directly from the outlet star 16 of the stretching-blowing machine 15 to the inlet star 18 of the labeling machine 17, while the second dynamic storage device $V_2$ transfers the labeled, filled and closed bottles G directly from the outlet star 22 of the filling and closing machine 20 to a distribution station 55, which is arranged before the packaging machine. From the outlet star 19 of the labeling machine 17 to the inlet star 21 of the filling and closing machine 20, the transport of the bottles G is carried out by a simple endless gripper chain 56 without dynamic storage function. Accordingly, the labeling machine 17 and the filling machine 20 are operated absolutely synchronously during normal operation.

The dynamic buffer $V_1$ according to FIGS. 1-7 comprises substantially a single endless conveying means 1 in the form of a roller chain 12 which is fitted with grippers 9, stationary guide rails 13, 14 for the roller chain with U-shaped cross section, a carriage 2 which can be moved along the guide rails 13, 14, and with a first 180° deflection 3 and a second 180° deflection 4 for the roller chain, an entry station E with a third 180° deflection 5 and a first drive device 7, and an exit station A with a fourth 180° deflection 6 and with a second drive station 8 for the roller chain 12. All four 180° deflections 3-6 are arranged substantially horizontally.

The third and fourth deflections 5, 6 define together with the connected parallel, aligned, strands of the guide rails 13, 14 a kind of longitudinal oval OV, which is interrupted only in the middle. The interruptions are followed by a coil- or spiral-shaped area W as well as by a vertical return devices R for the idle strand $1b$ of the roller chain 12.

As shown in FIGS. 3-7, the roller chain 12 presents a plurality of identical chain links 23, which are interconnected via cup and ball bearings 24 so they can move in a fully suspended manner. A total of three guide rollers 10, 11, 25 are rotatably mounted on each chain link 23. The guide roller 10 is arranged immediately on the chain link 23 and it engages in the groove-like recess of the guide rails 13, 14. The guide roller 11 is also mounted directly on the chain link 23 with a rotation axis which is offset by 90° with respect to the rotation axis of the roller 10 and it is applied to the free end of the arm of the U of the guide rail 13, 14, which is located in the area of the entry station E and the exit station A. The guide roller 25 is arranged on a pivoted lever 26, which in turn is mounted on the chain link 23 in a manner so it can be pivoted. Both the pivot axis of the pivoted lever 26 and also the rotation axis of the guide roller 25 are parallel to the rotation axis of the guide roller 11, where the guide roller 25 is mounted at approximately the same height as the guide roller 11 on the transition between the arm of the U and the connecting bar of the guide rails 13, 14. Between the chain link 23 and the pivoted lever 26, a tension spring 27 is inserted, which presses the guide roller 25 against the guide rails 13, 14. In this manner, each chain link 23 is guided with precision on the guide rails 13, 14 and it can be moved by a small force.

On each chain link 23, a passive gripper 9 in the form of elastic gripping pliers is arranged. Each gripper 9 has two gripper arms 28, 29, which are mounted on the chain link 23 in such a manner that they can be pivoted, and which are pressed through an elastic element 30 into its gripping position. The recesses of the gripper arms 28, 29 are shaped in such a manner that they circumferentially hold a bottle G below the support ring T over more than 180° and thus fix the bottle on the conveying means 1. When a bottle G is pressed into a gripper 9 and when a bottle G is pulled out of a gripper 9, the gripper arms 28, 29 yield elastically; therefore they do not require a separate forced guidance. Nevertheless, the bottles G are fixed by the grippers 9 with precision and reliably on the conveying means 1. In the process, the grippers assume the horizontal position shown in FIG. 3 in the area of the entry station E and the exit station A, in which position the middle axis of each bottle G is vertical. Here, the gripper 9 is applied against the external side of the circumferential track of the conveying means 1, namely the open side of the guide rails 13, 14. The latter are arranged in the area of the entry station E and the exit station A in such a manner that the open side of the U profile points horizontally towards the external side of the movement track. In these areas, the weight of the bottles G and the roller chain 12 is thus borne by the guide rollers 10, while the guide rollers 11 and 25 ensure the lateral guidance of the roller chain 12.

The roller chain 12 is driven by two identically constructed drive devices 7 and 8 in the area of the entry station E and in the area of the exit station A. Each drive device 7, 8 presents two identically large toothed wheels 31, 32 with a vertical rotation axis, which can be driven by a drive train 33 and an electro motor ME, MA with variable speed. The toothed wheels 31, 32 are provided with recesses on the circumference, which mesh with the axes of the guide rollers 11. The toothed wheels 31, 32 are mutually offset by half the pitch t of the roller chain 12, that is the distance between two grippers 9, to ensure an even drive. The drive devices 7, 8 engage from the side of the grippers 9 in the roller chain 12 and are therefore arranged on the bottle-free idle strand $1b$ of the roller chain 12.

Figure 7:
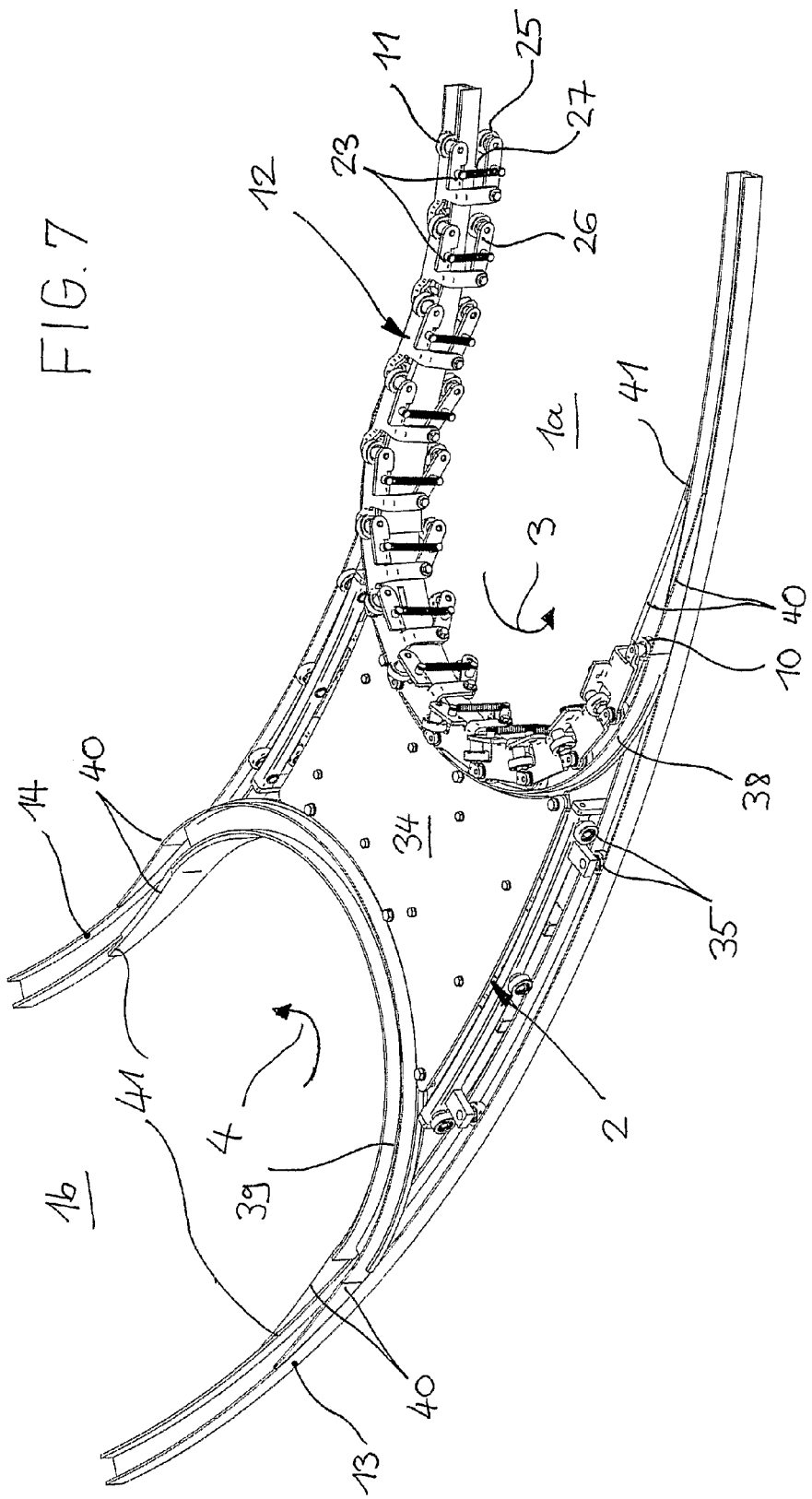
FIG. 7 shows the perspective view of the carriage of the dynamic storage device according to FIGS. 1-6.

As shown in FIG. 7, the carriage 2 presents a substantially horizontal base plate 34 and it is mounted by means of several rollers 35 with vertical or horizontal rotation axis in a movable manner on the two guide rails 13, 14. The latter are arranged in the movement area of the carriage 2, that is in the coil- or spiral-shaped area W of the conveying track F with precision equidistantly and here they present groove-shaped openings that are directed upward. The transition from the position—shown in FIGS. 3 and 4—of the guide rails 13, 14 with lateral opening into the just-mentioned position with the opening in the top position occurs through two winding zones 36 and 37, where the first one is formed after the entry station E and the second one immediately before the exit station A, in each case in the area of the conveying strand 1a. Because of the connection of the chain links 23 by cup and ball bearings 24, this transition presents no problems. The bottles G, which are fixed by the grippers 9 on the roller chain 12, are moved here from their vertical normal position into a horizontal storage position. This horizontal storage position of the bottles G, or the corresponding vertical position of the grippers 9, is maintained in the entire area of the conveying strand 1a between the two winding zones 36 and 37, and also in the area of the carriage 2.

The carriage 2 has a first 180° deflection 3 for the conveying strand 1a of the roller chain and a second, opposite, 180° deflection 4 for the idle strand 1b of the roller chain 12. To simplify the representation, the deflections are represented only partially in FIG. 7, and for the same reason the grippers and the bottles are not shown. Their position in the area of the first deflection 3 can be seen clearly in FIG. 2. One can also see that the bottles G in the horizontal position run over the base plate 34 together with the roller chain 12 from the stationary guide rail 14 to the stationary guide rail 13. To achieve this transfer, two semicircular guide arcs 38, 39 with U-shaped cross section, opening upward, are attached to the base plate 34. The guide arcs 38, 39 overlap with their end areas in each case with the stationary guide rails 13, 14 and they end in slanted ramps 40, which are aligned with precision with the upper edges of the fixed guide rails 13, 14. At the ends of the ramps 40 which are located on the inner side of the arc to allow a good transition, wedges 41 are placed, which in each case run laterally next to the support rails 13, 14. These wedges 41 engage on the upper guide rollers 11 which are slightly broader than the lateral arms of the stationary guide rails 13, 14. The position of the wedges 41 is indicated with a dot and dash line in FIG. 3, where one must picture the representation swiveled by 90° towards the right.

Because of the above-mentioned design of the carriage 2, one ensures that both the conveying strand 1a and also the idle strand 1b of the roller chain 12 are lifted out of one guide rail upward in a gentle and non-abrupt manner in the area of the first deflection 3 and the second deflection 4, and then gently deposited again after the deflection has been passed in the other guide rail. More precisely, the lifting is carried out by means of the wedges 41 and the ramps 40, which engage on the rollers 11, and the ramps 40, where the springy guide rollers 25 yield as a result of the corresponding expansion of the tension springs 27, where, nevertheless, because of the preliminary spring tension, the roller chain 12 is prevented from disengagement or lifting. The guide rollers 10 engage in the open groove of the guide arc 38, 39, so that an exact lateral guidance is ensured. The described function is identical for a standing and also a moving carriage 2.

An exact lateral guidance of the roller chain 12 in the area of the deflections 3, 4 is of great importance for the function of the dynamic storage device $V_1$, because the movement of the carriage 2 is effected only by the tensile force of the roller chain 12: if the conveying strand 1a is shortened by a corresponding difference in the speed of the drive stations 7 and 8, then the carriage 2 moves in the direction of the entry station E and the exit station A. If the idle strand 1b is shortened because of a corresponding difference in the speed of the drive stations 7, 8, then the carriage 2 moves away from the entry station E and the exit station A and increases the storage capacity.

Figure 2:
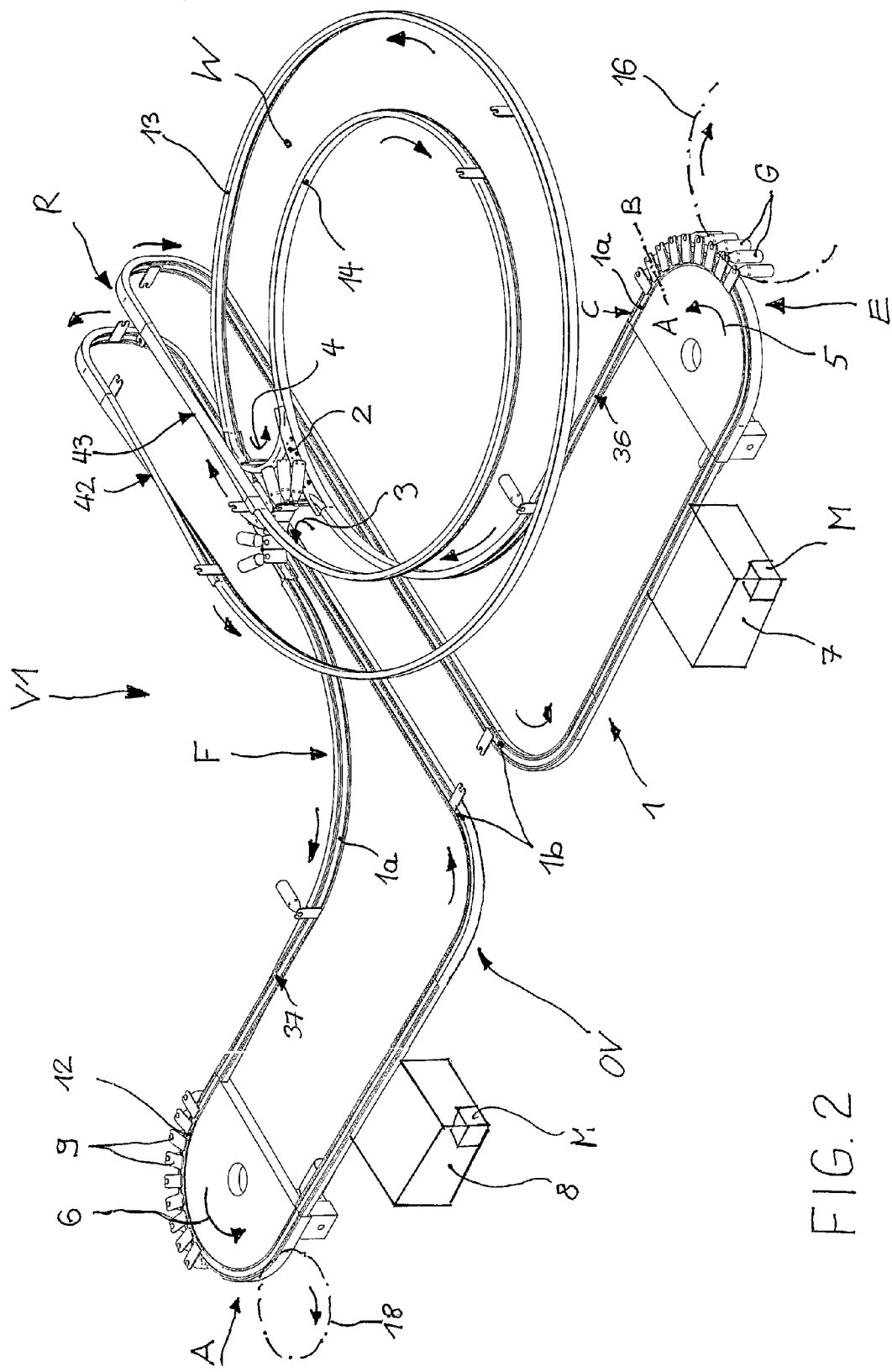
FIG. 2 shows the schematic course of the conveying means of a dynamic storage device according to FIG. 1.
Figure 5:
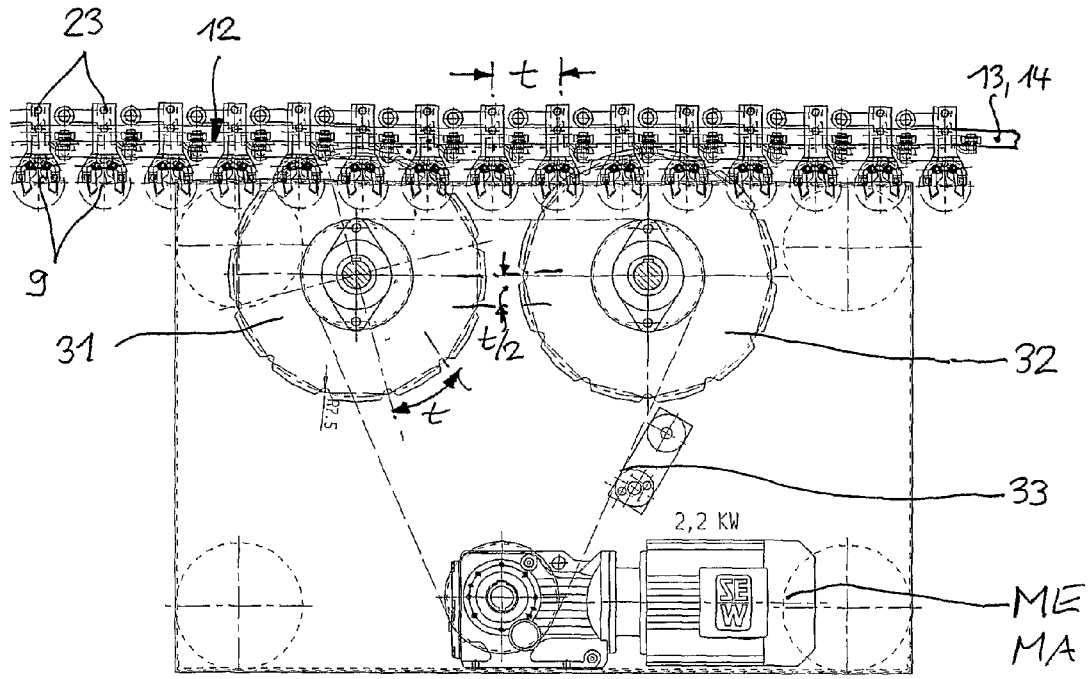
FIG. 5 shows the top view of a drive station for the conveying means.
Figure 6:
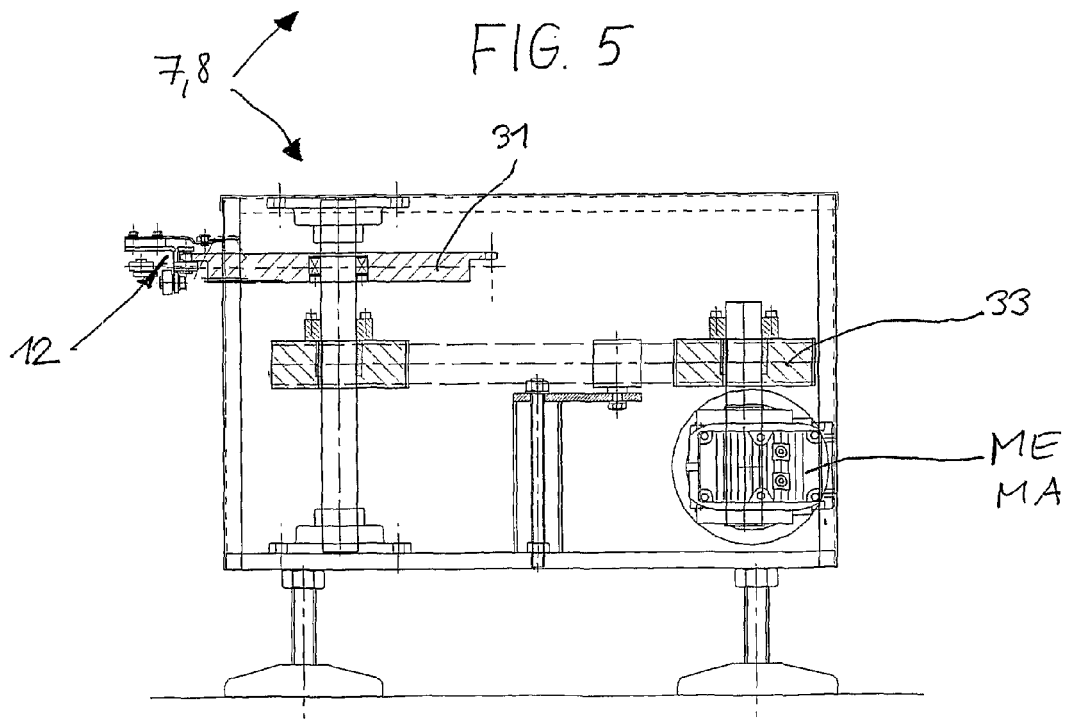
FIG. 6 shows the vertical cross section through a drive station for the conveying means.

The movement area of the carriage 2, and thus of the variable area of the conveying section F, is limited to the spiral- or coil-shaped area W of the guide rails 13, 14, where the latter run with precision equidistantly and in the shape of an arc with a slight slope. The resulting, defined, lower final position of the carriage 2 with minimal length of the conveying section F is represented in FIG. 2. The upper end position of the carriage 2 with maximum length of the conveying section F is located exactly opposite. The upper end position is followed by two horizontal, parallel winding zones 42, 43 of the guide rails 13, 14 for the idle strand 1b, and those areas are followed by vertical return devices R, which move the roller chain 12 back into the normal transport plane, or out of that plane, which is defined by the deflections 5 and 6. Next there are two additional parallel, horizontal areas of the guide rails 13, 14, which lead up to the front side of the oval OV and then open after 90° deflections into the entry station E or exit station A. In FIG. 2, only partial areas of the roller chain 12 with grippers 9 are represented, although the roller chain 12 in fact runs over the entire represented area of the guide rails 13, 14 with the exception of the two short pieces between the deflections 3 and 4 of the carriage 2. There the track rollers 35 of the carriage 2 are located.

FIG. 2, to simplify the representation, shows only a single spiral or coil. In practice, the storage area proper will be designed in the shape of a multiple coil with vertical and/or horizontal middle axis/axes to achieve an appropriately high buffering capacity. The return devices R are then lengthened accordingly.

During the normal operation of the above described device $V_1$, the motor ME is driven exactly synchronously with the stretching-blowing machine 15 and the motor MA exactly synchronously with the labeling machine 17. Instead, it is also possible to connect the drive stations 7, 8 by means of drive trains by the drive motors of the stretching-blowing machine 15 or the labeling machine. Here, the just blown bottles G in the input station E are snapped in successively in the usual manner at the proper pitch by the outlet star 16, which is provided with controllable gripper arms, of the stretching-blowing machine 15 into the grippers 9 of the roller chain 12 and thus fixed securely. Subsequently, the conveying strand 1a of the roller chain 12 runs, in the direction of the arrow, sequentially through the first winding zone 36, an area of varying length of the internal coil W, the first deflection 3 of the carriage 2, an area of varying length of the external coil W, the second winding zone 37, and finally reaches the fourth deflection 6 and the starting station A. There, the bottles G are taken up one after the other by the inlet star 18 of the labeling machine 17, which is provided with controlled grippers, by the grippers 9.

After passing the inlet star 18, the idle strand 1b of the roller chain 12 runs, in the direction of the arrow, sequentially through the second drive device 8, a return devices R, a winding zone 42, an area of varying length of the external coil W, the second deflection 4 of the carriage 2, an area of varying length of the internal coil W, the winding zone 43, a return devices R, the first drive station 7, and finally it again reaches the third deflection 5 and the entry station E.

If the two drive stations 7 and 8 work with the same output, then the above-described movement of the conveying means 1 occurs while the carriage 2 is not moving. If the labeling machine 17, and thus the second drive station 8, runs more slowly than the first drive station 7, or if it is stopped, then the conveying strand 1a between the entry station E and the exit station A is lengthened; the idle strand 1b is shortened to the same extent, resulting in the carriage 2 moving counterclockwise from the position shown in FIG. 2, and the conveying section F and the storage capacity are increased as a result. This carriage movement continues until the two drive stations 7 and 8 work again with the same output. If the second drive station 8 works more rapidly than the first drive station 7, then the process is reversed, the carriage 2 moves counterclockwise, and the conveying section F and the storage content are decreased as a result.

In this manner, without any additional drives and control measures for the carriage 2, an automatic change in the conveying section F is produced solely as a function of the speed of the drive devices 7 and 8. In the process, the bottles G, due to their continual fixation by the grippers 9, are moved from the entry station E to the exit station A, while remaining stable, and they can be moved at a greater speed even in the area of the deflections. Because of the horizontal orientation of the bottles G in the area of the spirals or coils W, the packing density is very high and thus the storage capacity is high with little space consumption. If needed, the bottles G can also be transferred in the state in which they are used to corresponding processing machines, for example, a rinser, or a processing step, for example, cooling or cleaning, occurs already in the device $V_1$. However, it is also possible, due to the elasticity of the grippers 9, to remove by sorting certain bottles G at certain places, for example, because of errors which have been detected in an inspection device, or the bottles G can be distributed in the area of the exit station A to several removing conveyors. Furthermore, on the chain links 23, lateral braces for the bottles G can be applied and/or the grippers can be manufactured in the form of a single piece made of an elastic plastic.

For the transport of heavier objects, for example, filled glass bottles, which are not suitable for a horizontal buffering, the winding zones can be omitted, so that the guide rails 13, 14 point upward even in the area of the entry station E and the exit station A with the groove-shaped opening, as shown in FIG. 7. In this case, the grippers 9 should be arranged opposite the position in FIG. 3 with a swiveling by 90° on the chain link 23, in such a manner that they are at a sufficient distance from the guide rollers so that the bottles G can be transferred without impediment over the carriage 2. In this case, it is also possible to attach instead of the grippers 9, substantially horizontal support plates 44, which can negotiate curves, to the chain links 23, as shown in FIG. 9 for another embodiment example. These support plates form a substantially continuous conveyance surface for the objects, which lie on said surface. Here, it should be noted that the slope of the coil W and the slope of the ramps 40 are added. For relatively fixed objects, such as, for example, cardboard packages for drinks, this is not a problem. For less fixed objects, such as, for example, filled drink bottles, the embodiment example according to FIGS. 8-10, which is described below, is particularly advantageous, because the support plates 44 in the area of the carriage 2' here do not experience any additional elevation movement.

Figure 8:
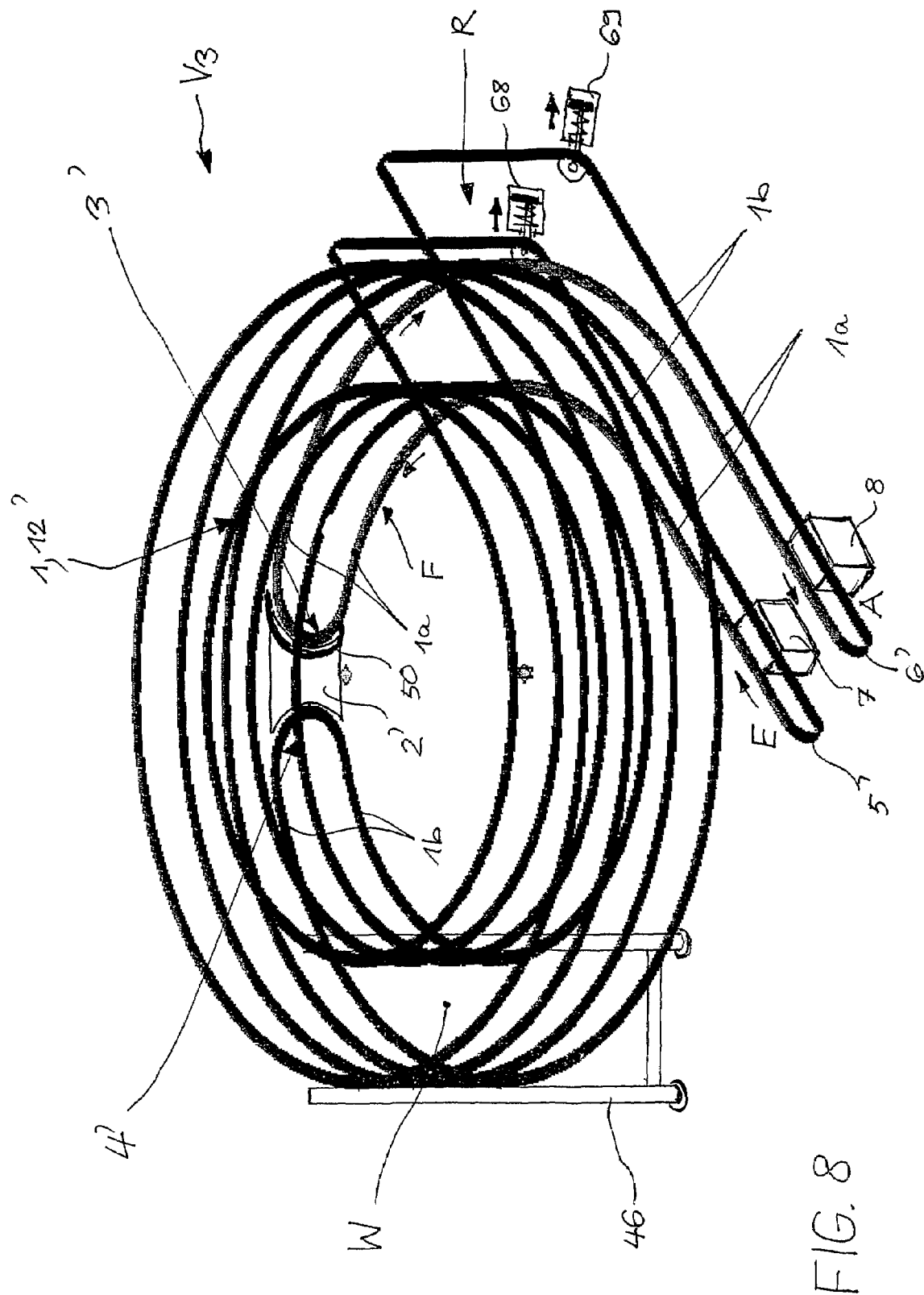
FIG. 8 shows the schematic course of the conveying means of another embodiment of a dynamic storage device.
Figure 9:
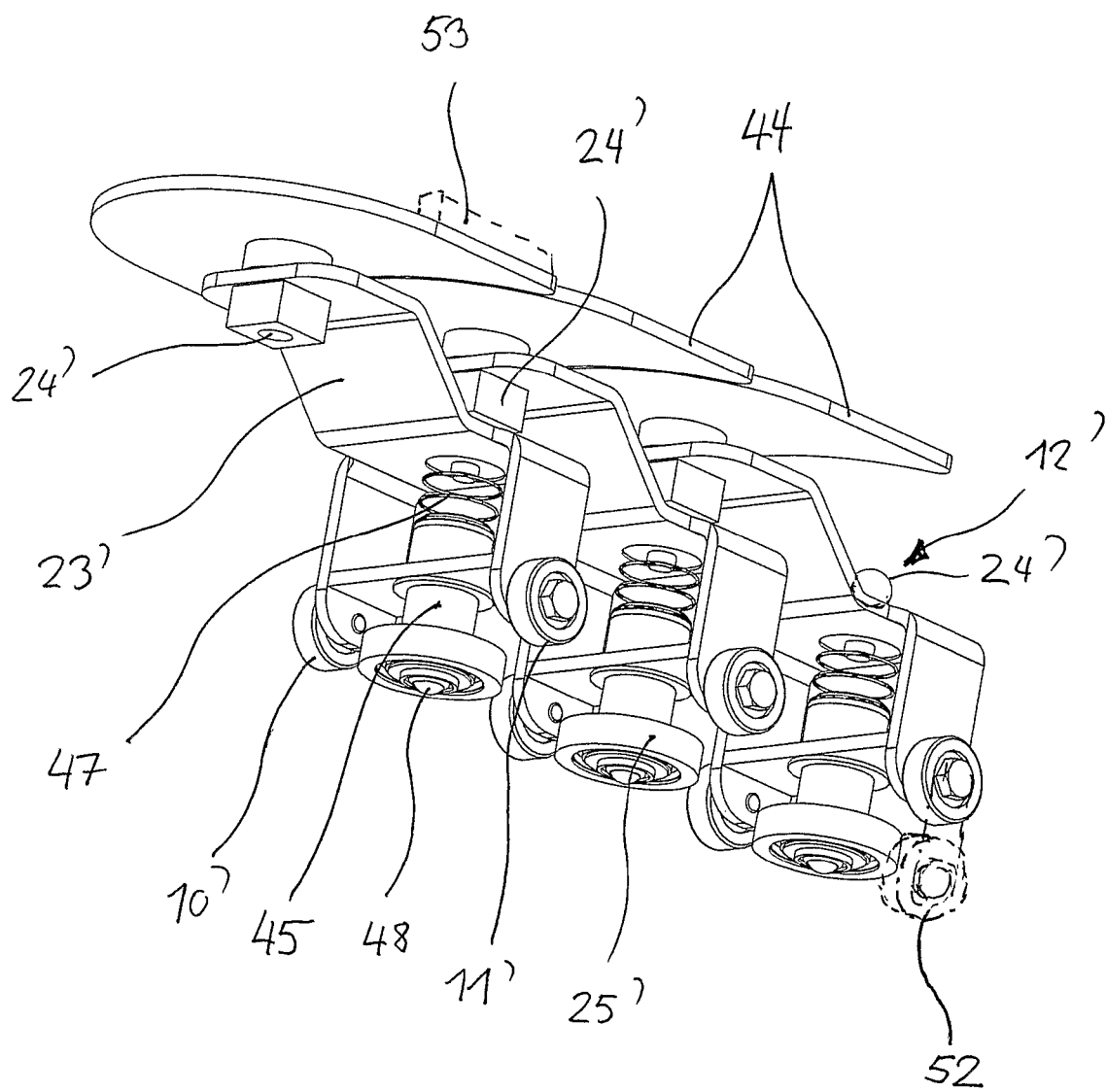
FIG. 9 shows the conveying means of the dynamic storage device according to FIG. 8 in detail.
Figure 10:
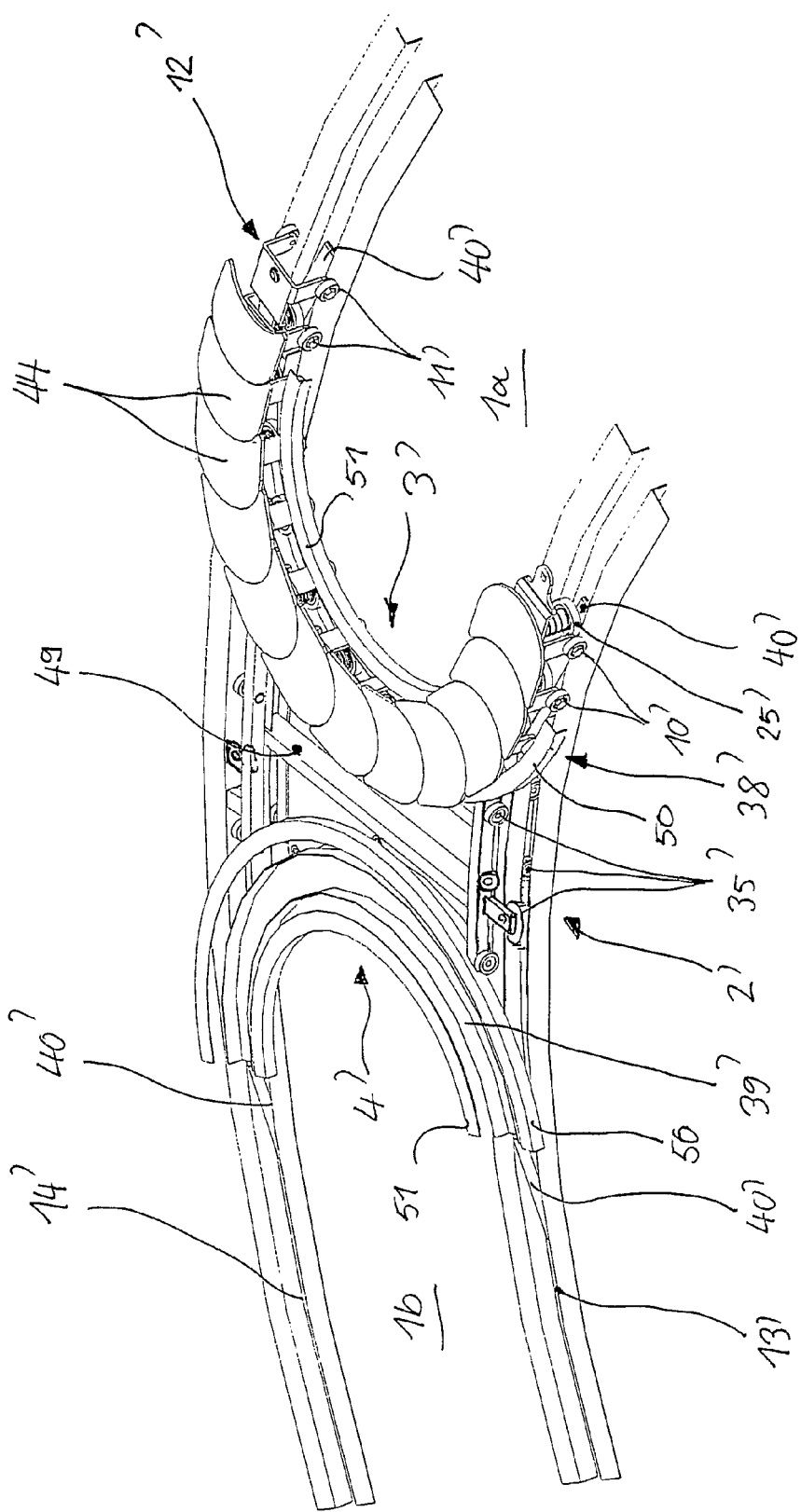
FIG. 10 shows the perspective view of the carriage of the dynamic storage device according to FIG. 8.

The dynamic buffer $V_3$ according to FIGS. 8-10 comprises substantially a single endless conveying means 1 in the form of a roller chain 12', which is fitted with support plates 44 which can negotiate curves, stationary guide rails 13', 14' for the roller chain, each made of two angular profiles arranged in a mirror arrangement, a carriage 2', which can be moved along the guide rails 13', 14', with a first 180° deflection 3' and a second 180° deflection 4' for the roller chain, an entry station E with a third 180° deflection 5' and a first drive device 7, and a starting station A with a fourth 180° deflection 6' and a second drive station 8 for the roller chain 12'. The first and second deflections 3', 4' are arranged substantially horizontally, while the third and fourth deflections 5', 6' run substantially vertically.

The course of the conveying section F with a conveying strand 1a and an idle strand 1b of the conveying means 1 is defined by the deflections 3'-6' and the guide rails 13'-14', where the guide rails 13', 14' in the area of the entry station E and the exit station A are arranged parallel to each other. In addition, the coil W is provided with several windings to increase the storage capacity; accordingly, the vertical return devices R is lengthened. Otherwise, the effect and function are identical to those indicated for the dynamic storage device $V_1$ according to FIG. 2. The entire arrangement stands on several columns 46, of which only two are represented. In contrast to the dynamic storage device $V_1$, however, the dynamic storage dynamic device $V_3$ is not provided with winding sections for the conveying means 1'. This means that the support plates 44 of the conveying strand 1a, except for the slope of the coil W, are oriented substantially continuously horizontally and are therefore capable of transporting standing bottles, cardboard packages and similar items without breakdown even at high output levels.

As shown in FIGS. 9 and 10, the endless roller chain 12' presents a plurality of identical chain links 23', which are interconnected via a cup and ball bearing 24' so that they can be moved in a fully suspended manner. On each chain link 23', a total of three guide rollers 10', 11', 25' are mounted rotatably. The two guide rollers 10', 11' with horizontal rotation axis are arranged immediately on the chain link 23' and they run on the two horizontal arms of the guide rails 13', 14'. The guide roller 25' is arranged on the bottom side of the chain link by means of a vertical bolt 45 in such a manner that its height can be adjusted, and it is pushed by a compression spring 47 downward in the lower end position, which is fixed by abutments that are not represented, as shown in FIG. 9. At the lower end of the bolt 45, a thrust block 48 in the form of a ball is arranged. The guide roller 25' engages between the two vertical arms of the guide rails 13', 14', which form a kind of guidance groove. In this manner, each chain link 23 is guided with precision on the guide rails 13', 14', and can be moved with little force. In addition, on the horizontal, upper arm, which is slightly crimped upward, of each chain link 23', and which carries the cup and ball bearing 24, a substantially horizontal support plate 44 for the objects to be transported is attached. The support plates 44 are concave-convex in design and thus also capable of negotiating curves in the horizontal direction.

As shown in FIG. 10, the carriage 2' has a substantially horizontal frame 49, and it is mounted by means of several rollers 35' with vertical or horizontal rotation axis on the two support rails 13', 14', in such a manner that it can be moved. It presents a first 180° deflection 3' for the conveying strand 1a of the roller chain 12' and a second, opposite, 180° deflection 4' for the idle strand 1b of the roller chain 12'. This situation is represented only partially in FIG. 10 for simplicity's sake. The deflections 3', 4' are attached by means of two semicircular guide arcs 38', 39' to the frame 49, where said arcs present a U-shaped cross section which opens upward. The guide arcs 38', 35' overlap with their end areas over the guidance groove which is formed between the two angular profiles of each guide rail 13', 14'. They transition into slanted ramps 40', which engage in the guidance groove. Through these ramps 40', which engage on the thrust blocks 48, the movable guide rollers 25' are gently lifted out of the guidance groove of the guide rails 13', 14', or they are lowered gently into the guidance groove. Between the two ramps 40' of the guide arc, the thrust blocks 48 slide continually on the bottom surface of each guide arc 38', 39'. This change in height is limited to the movable guide rollers 25', while the chain links 23' and the support plates 44 do not leave their plane of conveyance. To ensure an exact guidance of the support plates 44 even in the area of the deflections 3', 4', additional arc-shaped guide elements in the form of, in each case, two parallel down holding clamps 50, 51 are provided concentrically with respect to the already described guide arcs 38', 39', where the guide elements engage from above on the two guide rollers 10', 11' of each chain link 23', and thus reliably prevent a tipping movement or a lifting of the chain link 23'.

On the basis of the above described embodiment of the carriage 2' one ensures that both the conveying strand 1a and also the idle strand 1b of the roller chain 12', in the area of the first deflection 3' and the second deflection 4' are separated gently and without impact from one of the guide rails 13', 14' and coupled to the other one of the guide rails 13', 14'. This function is identical for the standing or the moving carriage 2'. To improve the guidance, an additional guide roller 52 can be arranged—as indicated in FIG. 9 using a dot and dash line—can be arranged on one or both sides of the chain link 23' under the guide rollers 10' and 11', respectively. Moreover, it is also possible, in the case of the roller chain 12', to arrange grippers 9 for the fixation of the object G in addition to the support plates 44. It is recommended, particularly in the case of high output levels, to also arrange, in the area of the deflections 3', 4' on the carriage 2' at least on the side of the guide elements which is located outside of the arc, guide elements for the objects G, in the form of guide railings, bands, air nozzles, small roller railings, etc. The guide elements, if necessary, can also be driven by engagement with the chain movement in the area of the carriage 2'. On the side which is inside the arc, guide bars 53 for the objects G can be applied on the support plates 44, as represented with a dot and dash line. If the coil W is stretched to the shape of an oval, then it is advantageous to design carriage 2, 2' with articulations, for example, with a pivot articulation in the middle of the base plate 34 or of the frame 49.

Figure 11:
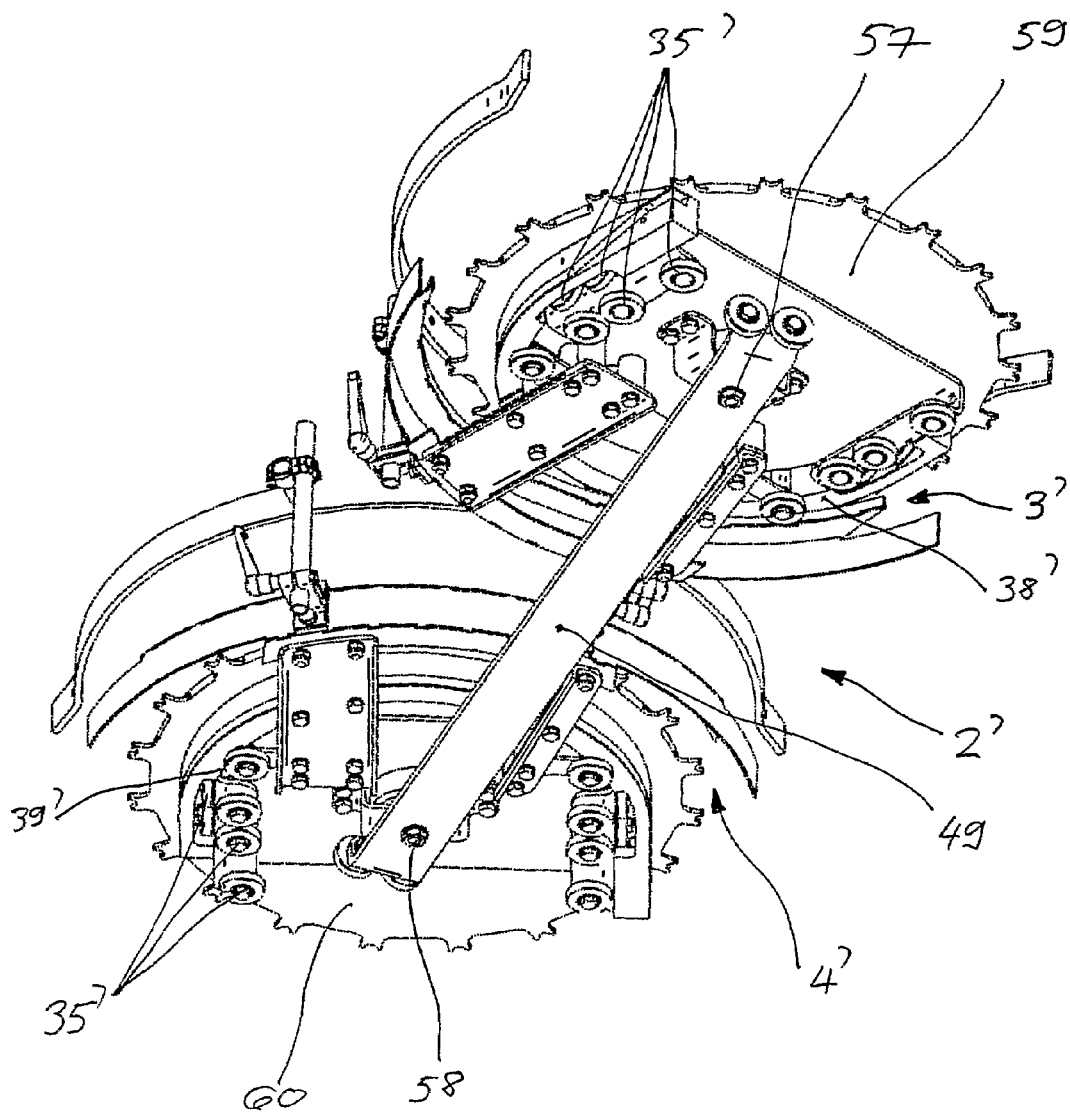
FIG. 11 shows the view from below of a carriage with articulations.

The carriage 2' can negotiate curves even better if, as shown in FIG. 11, each deflection 3', 4' is mounted pivotably on the frame 49, with its guide arc 38', 39' and other attached parts, by means of an articulation 57, 58, and if each deflection engages with its own track roller 35' in the guide rails 13', 14'. Coaxially to the articulations 57, 58, deflection wheels 59, 60 can be arranged, which are surrounded by the roller chain 12' and thus receive the tractions exerted by the latter chain. The guide arcs 38', 39' consequently experience a reduction in load.

Figure 12:
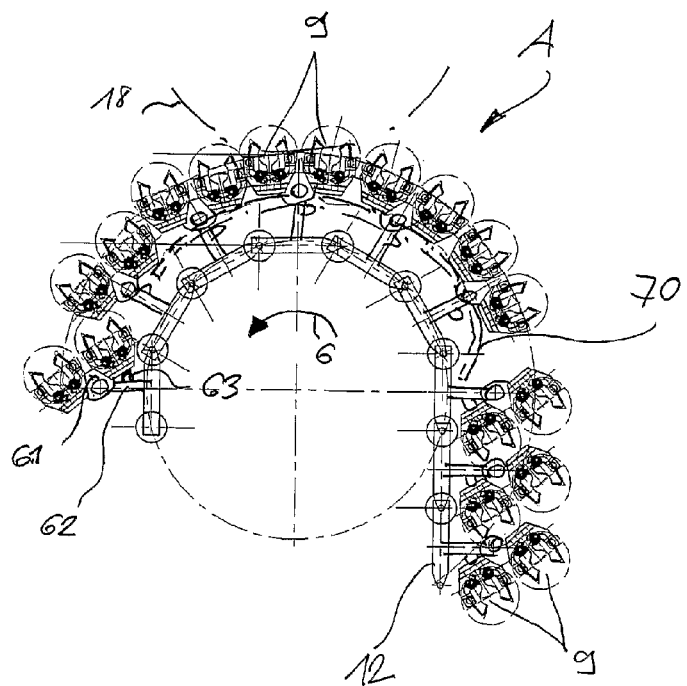
FIG. 12 shows the partial top view of a conveying means with movable grippers.

In the case of the dynamic storage device according to FIGS. 2-6, the grippers 9 are arranged in a fixed position on the roller chain 12. In contrast to that arrangement, in the embodiment according to FIG. 12, the grippers 9 are arranged on the roller chain 12 in such a manner that they can be moved. In each case, two adjacent grippers 9 are combined to form a single structural unit 61, which in turn is mounted in such a manner that it can be pivoted on the lateral extension arms 62 of the roller chain 12.

By means of springs or similar parts, which are not shown, the structural unit 61 is pressed against the abutment 63 formed on the extension arms 62. In this position, the connection line between the two grippers 9 of the structural unit 61 runs substantially transversely to the roller chain 12, i.e., the connection line and the roller chain form a right or obtuse angle.

Using in each case one stationary cam 70, which is represented with a dot and dash line, the structural units 61 are pivoted in the area of the deflections 5, 6 of the entry station E and of the exit station A into a second position, in which the connection line between the two grippers 9 of a structural unit 61 is substantially parallel or tangential to the roller chain 12. In this position, the objects G can be introduced into the grippers 9, or removed from them, without problem individually and one after the other by the inlet star 18 or the outlet star 19. These processes become possible because of the spreading open of the structural unit 61 due to the separation from the roller chain 12, which is caused by the extension arms 62. In the straight areas of the roller chain, on the other hand, the grippers are very close to each other, so that, compared to a conveying chain with rigid grippers, a substantially higher storage capacity can be achieved with the same length of the roller chain 12.

Figure 13:
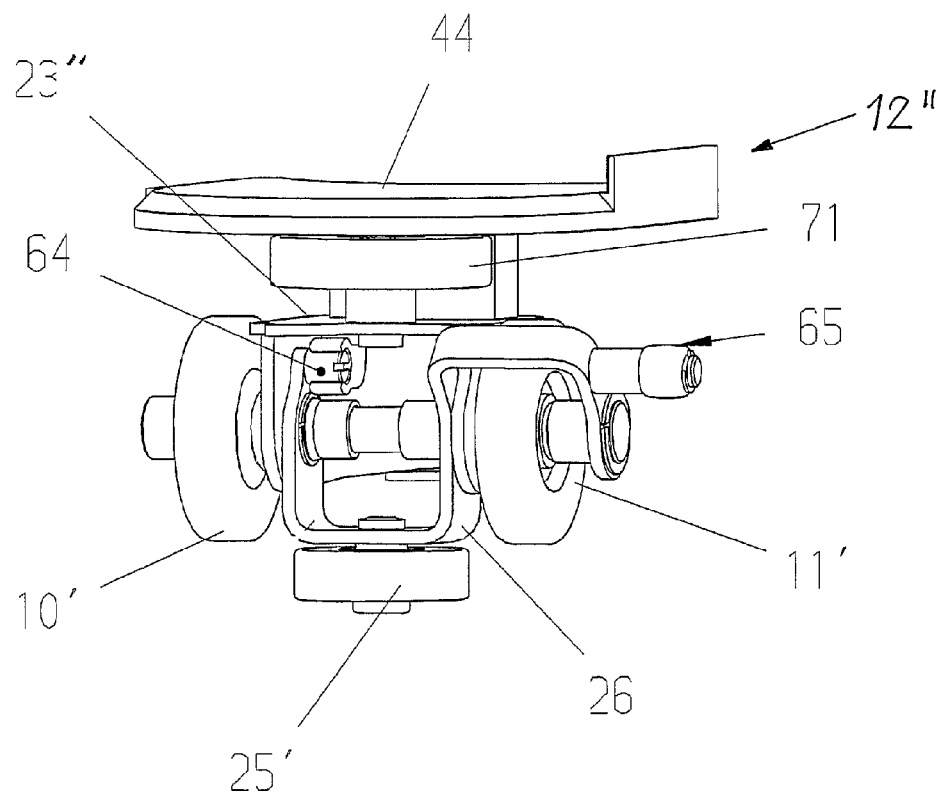
FIG. 13 shows the perspective view of a chain link with pivotable guide roller

The roller chain 12" according to FIG. 13 differs substantially from the roller chain 12' according to FIGS. 9 and 10 in that the movable guide roller 25' is connected by articulation in a manner which does not allow for height adjustment, rather the articulation is achieved by means of a pivoted lever 26 which allows pivoting on the chain link 23". In the represented, lower end position of the guide roller 25', where the latter engages between the stationary guide rails 13', 14'—not shown—the guide roller is fixed by means of a snap connection 64 to the chain link 23" in a manner which allows detachment. The pivoted lever 26 is firmly connected to a control cam 65. The latter is pressed downward in the area of the deflection 3' and 4' of the carriage 2' by cams in the manner of the down holding clamps 51, resulting in the guide roller 25' being swiveled out of the guide rails 13', 14', and the roller chain 12" can be deflected.

Immediately below the support plate 44, an additional guide roller 71 is mounted on the chain link 23". This guide roller takes over the guidance of the roller chain 12" in the area of the deflection 3', 4', either by means of the guide arcs 39' or by means of the deflection wheels 59, 60.

This embodiment allows a particularly gentle transition of the roller chain 12' in the area of the carriage 2' without change in the height of the support plate 44, while presenting a simple construction procedure.

The dynamic storage device according to FIGS. 14 and 15 differs from the embodiment according to FIGS. 3 and 4 by features including the fact that here the guide rails 13 and 14 are formed in each case by six parallel round rods 72. Furthermore, on each chain link 23, two double levers 66, 67 are mounted in a scissor-like arrangement which allows pivoting. At the ends of the two double levers 66, 67, a total of four profiled guide rollers 73 are mounted rotatably.

By means of spiral springs 74, the double levers are pushed in the spread out position which is represented in FIG. 14 on the right side as well as in FIG. 15, where the spiral springs in this position are substantially perpendicular to the round rods 72. In this position, the guide rollers 73 engage on the sixth round rods 72 and they achieve a precise guidance of the roller chain 12.

The guide arcs 38, 39 of the carriage 2 are also formed from parallel round rods 75, of which there are four. The latter rods are designed in such a manner that they engage between the round rods 72 of the guide rails 13, 14 and are capable of gripping the guide rollers 73 at their tapered areas. At the time of the entry into the round rods 75 of the guide arcs 38, 39, the double levers 66, 67 are pressed together against the force of the tension spring 74, so that they run transversely to the round rods 72. In this spread position, they are taken over by the round rods 75 and guided through the guide arcs 38, 39 and the deflections 3, 4, respectively, to the given other guide rail 13 or 14, respectively. There they are released by the round rods 75, and then the double levers are spread open and the guidance is again taken over by the round rods 72.

A particularly cost effective and operationally reliably embodiment of a dynamic storage device is shown in FIGS. 16-22. This storage device differs from the storage device of FIGS. 14 and 15 particularly in that here the guide rails 13 and 14 are each formed by two parallel pipes or round rods 72, and in that on each chain link 23 only one double lever 66 with profiled guide rollers 73 is mounted in such a manner that it can be pivoted.

On each end of each double lever 66, profiled guide rollers 73 are arranged so they can rotate independently of each other, in such a manner that they receive or partially surround the given round rod 72.

Figure 16:
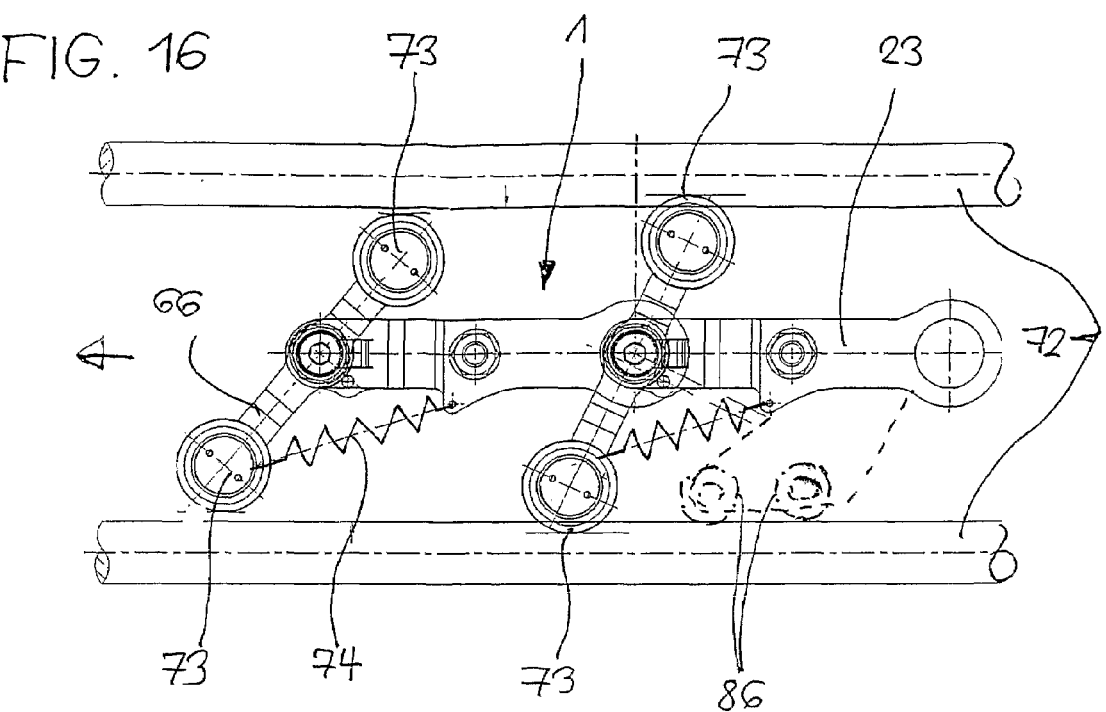
FIG. 16 shows the lateral view of a conveying means with lever-like pivotable guide rollers
Figure 21:
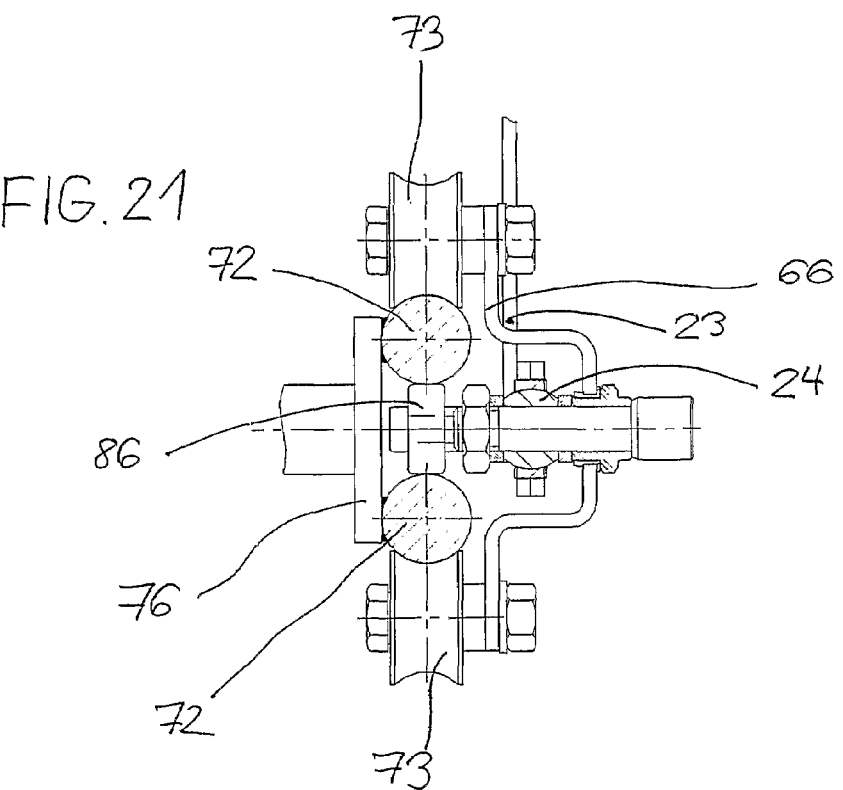
FIG. 21 shows the cross section through an additional embodiment of a roller chain with lever-like pivotable guide rollers

Between each chain link 23 and its double lever 66, a tension spring 74 is inserted, which tends to pivot the double lever 66. Thus the guide rollers 73 are pushed on the round rods 72. In FIG. 16, the tension spring 74 tends to pivot the double levers 66 in the counterclockwise direction.

The double levers 66 are at a slight slant with respect to the link chain 12 or the round rods 72, and they can thus compensate without any problem for slight changes in the separation between the round rods 72 which are attached to spacers 76 by welding or clamping. The pivot axis between the chain link 23 and the double lever 66 is located either exactly in the middle of the double lever (FIG. 17) or slightly off center (FIG. 16). The off-center arrangement, under some circumstances, results in a better stabilization of the double lever 66, particularly in case of a high tensile force and in the area of the deflections.

Figure 18:
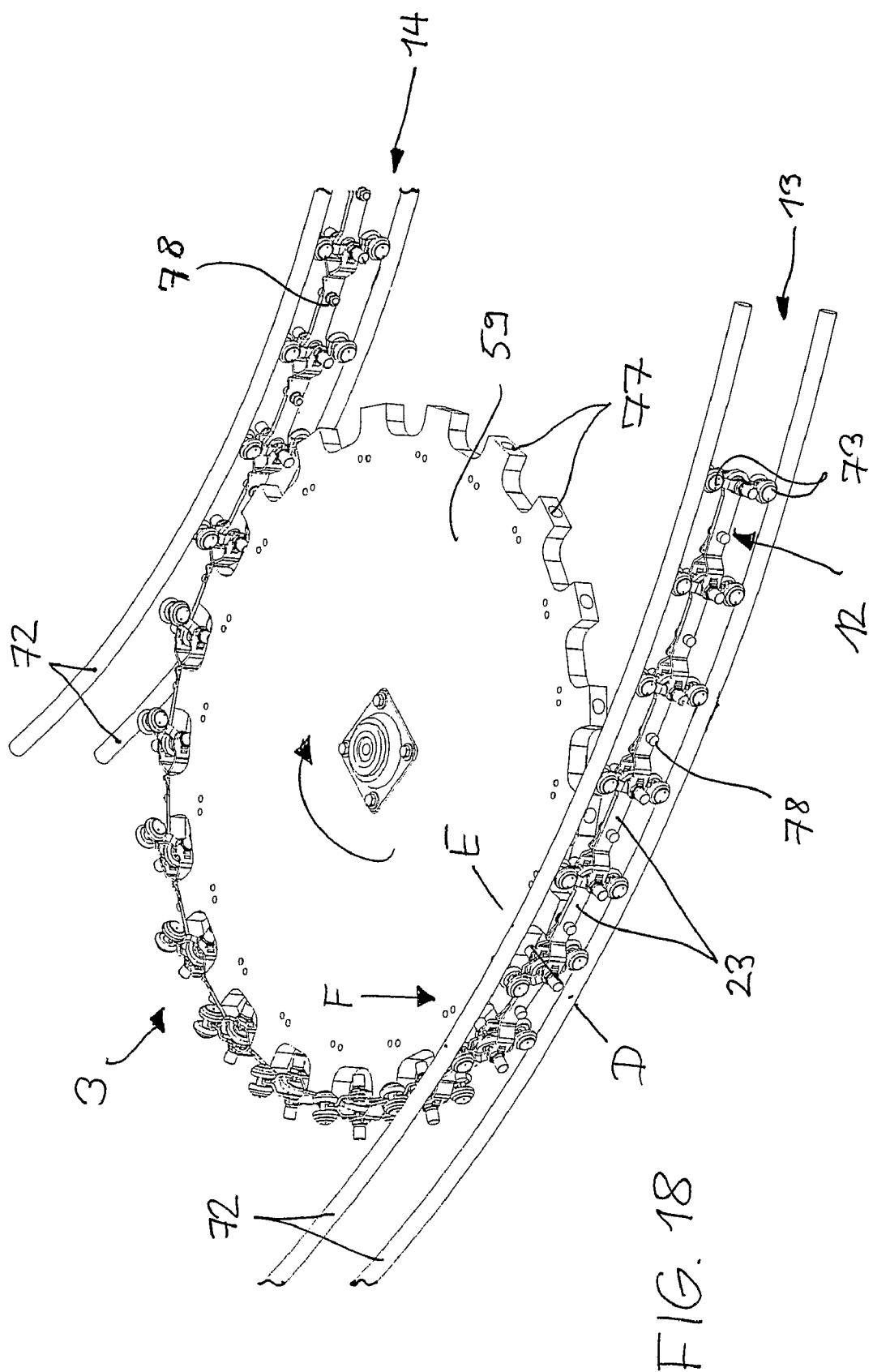
FIG. 18 shows the perspective view of deflection of the conveying means according to FIGS. 16 and 17, without steering forks
Figure 19:
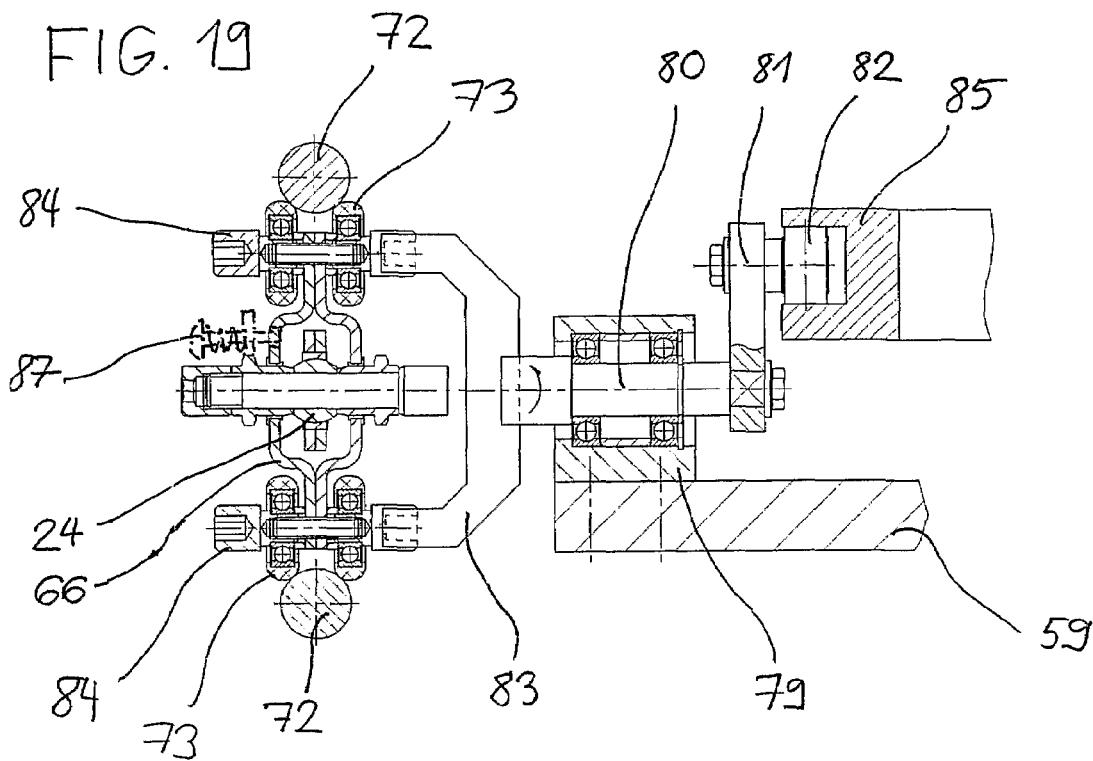
FIG. 19 shows the cross section DE according to FIG. 18 with steering fork
Figure 20:
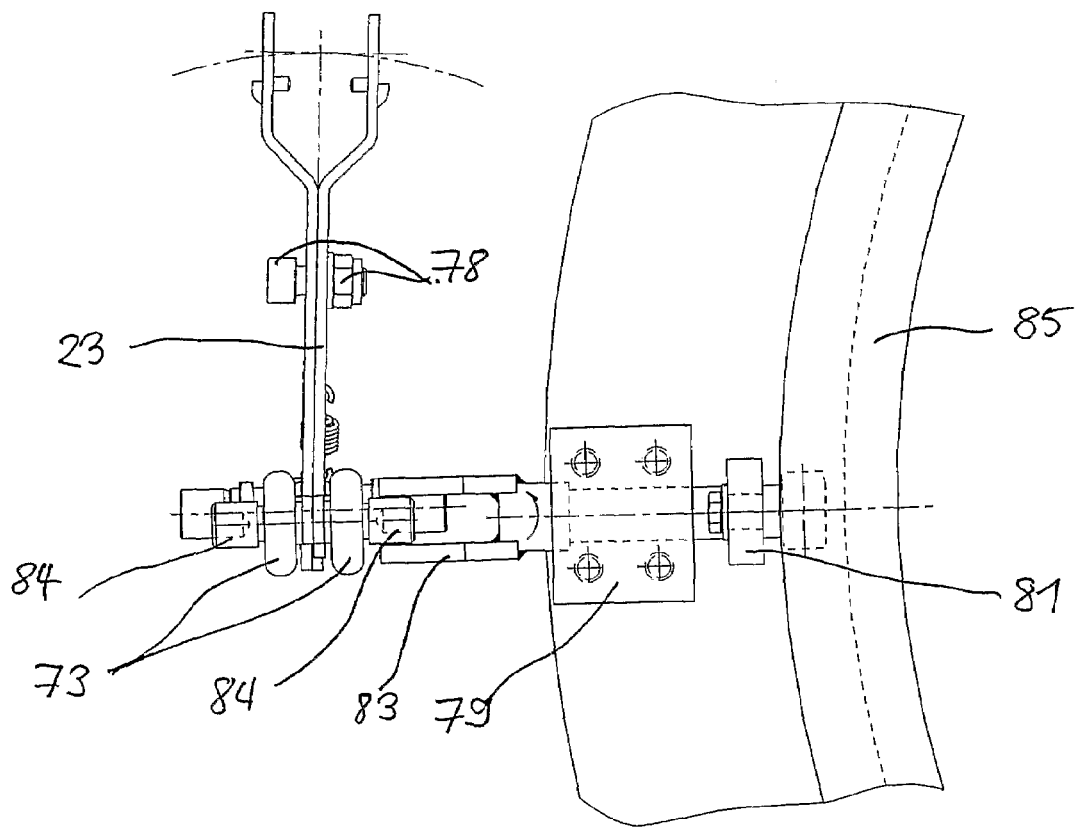
FIG. 20 shows the view F according to FIG. 18

The exact guidance of the link chain 12 in the area of the first and section deflection 3, 4 of the carriage 2 is carried out by toothed deflection wheels 59, 60, in a manner similar to FIG. 11. In FIG. 18, only one deflection wheel 59 is shown. Both deflection wheels 59, 60 are provided on their circumference with bores 77, in which bolts or heads 78 provided on the chain links 23 engage.

Directly on each deflection wheel 59, 60 or on the rings or disks that are rotatably attached to them, bearing blocks 79 are attached in the areas between the bores 77 (not shown in FIG. 18). In each bearing block 79, a shaft 80 is mounted rotatably and oriented radially to the rotation axis of the deflection wheel 59, 60. On the inner end of the shaft, a roller lever 81 with a rotating cam roller 82 is attached. A two-arm control fork 83 is attached to the external end of each shaft 80. Said fork works in cooperation with control heads 84, which are arranged on both sides of the guide rollers 73, coaxially with respect to the latter on the double lever 66.

The control forks 83 are designed in such a manner that they engage the two control heads 84 on the same side of a double lever 66 on top of each other, substantially on the areas which point in the direction of movement and opposite the direction of movement of the roller chain 12. In this manner, an exact pivoting or fixation of the double lever 66 in the area of the deflections 3, 4 can be achieved.

The cam rollers 82 engage in two groove-like control cams 85, which are attached to the carriage 2 and 2', respectively. The control cams 85 are designed in such a manner that the control forks 83, in the inlet area and the outlet area between the deflection wheels 59, 60 and the roller chain 12, correspond to the slanted position of the double lever 66, in which the latter are engaged with the round rods 72. Thus the stable introduction and exit of the roller chain 12 becomes possible. However, in the intermediate area, the control forks 83 assume a more slanted position, so that the double levers 66, in accordance with the left position in FIG. 16, do not engage in the inlet area and engage in the outlet area with the round rod 72.

An additional improvement of the guidance of the roller chain 12 on the round rod 72 can be achieved by cylindrical support rollers 86, which are arranged in a fixed position on the chain links 23. The support rollers 86 can also carry the weight of the link chain 12, the grippers 9 and the bottles G. Because of their cylindrical jacket, they do not impede the engagement or disengagement between the round rod 72 and the guide rollers 73.

It is also possible to fix the double levers 66 in a detachable manner with respect to the chain links 23 by means of a snap-on connection 64, similar to that of FIG. 13. Instead, one can also attach spring-mounted control cams 87 to the chain links 23, which cams are attached by means of cam ramps—not shown—to the carriage 2, 2', or disengaged with the double levers 66.

Figure 22:
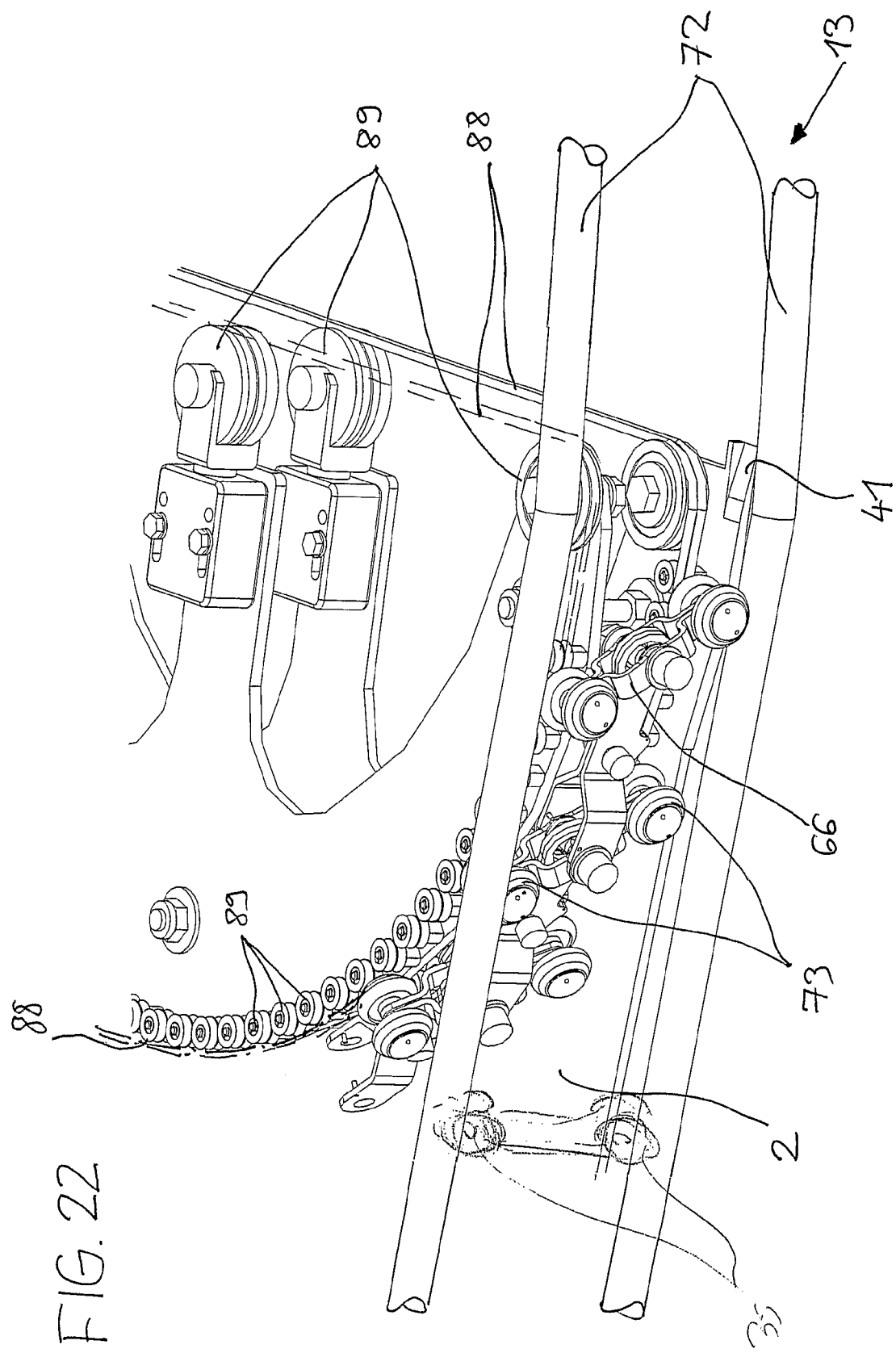
FIG. 22 shows the perspective view of another deflection of the conveying means according to FIGS. 16 and 17

The dynamic storage device according to FIG. 22 differs from the storage device according to FIGS. 16-21 primarily in that here the uncoupling of the pivotable guide rollers 73 occurs by means of ramps that are attached to the carriage 2, similarly to FIG. 7. These slanted ramps 41 lift the abutting lower guide rollers 73, resulting in the double lever 66 pivoting and the rollers 73 disengaging from the round rods 72. In this position, the double levers 66 are attached by the base plate of the carriage 2, over which the rollers 73 run. Conversely, in the outlet area of the deflections 3, 4, the bottom guide rollers 73 are lowered through corresponding ramps 41. Belts 88, which run over the rollers 89, receive the tensile force exerted by the roller chain 12, so that no deflection wheels are required.

Figure 23:
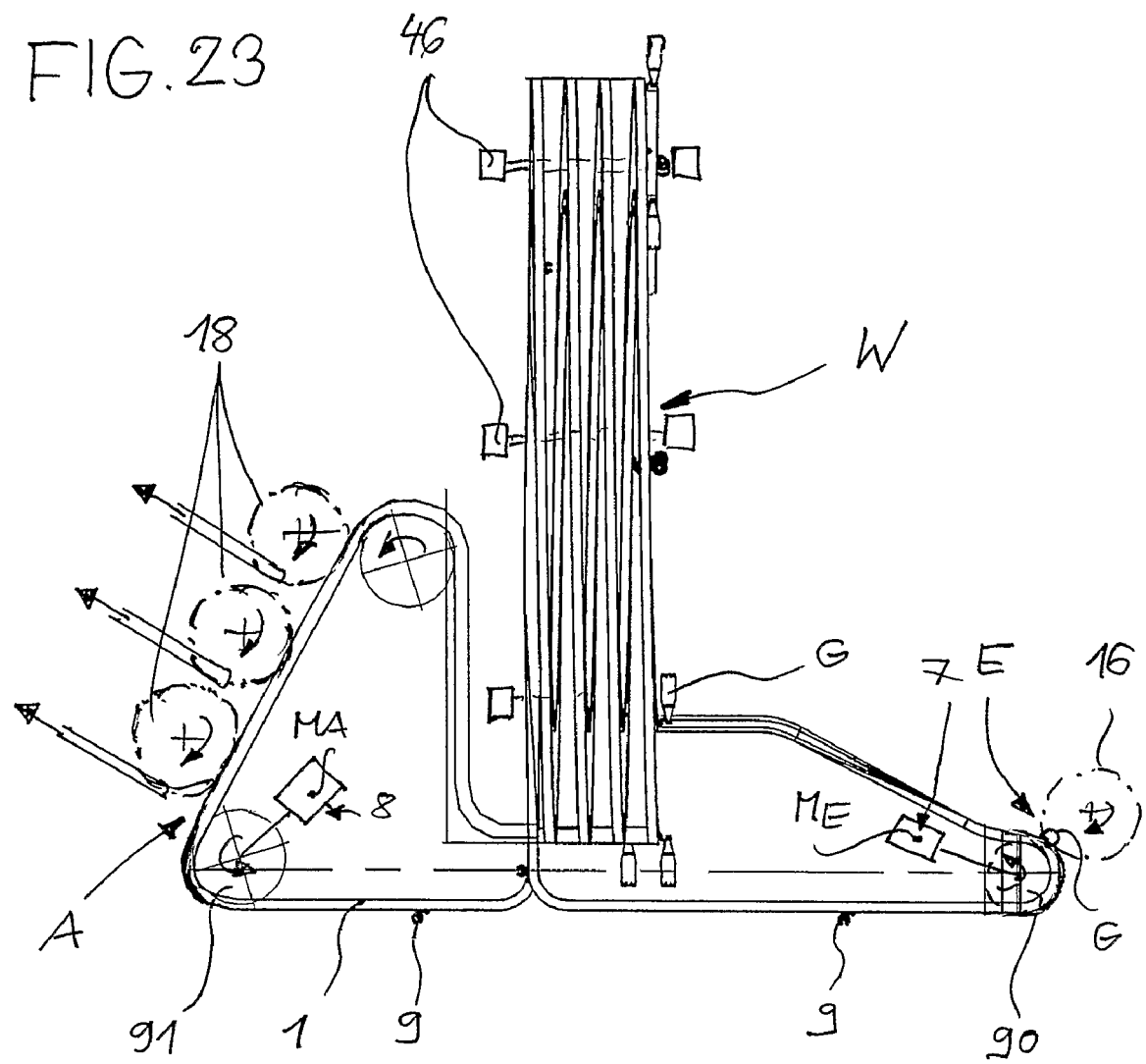
FIG. 23 shows the top view of a dynamic storage device with horizontal coil axis.
Figure 24:
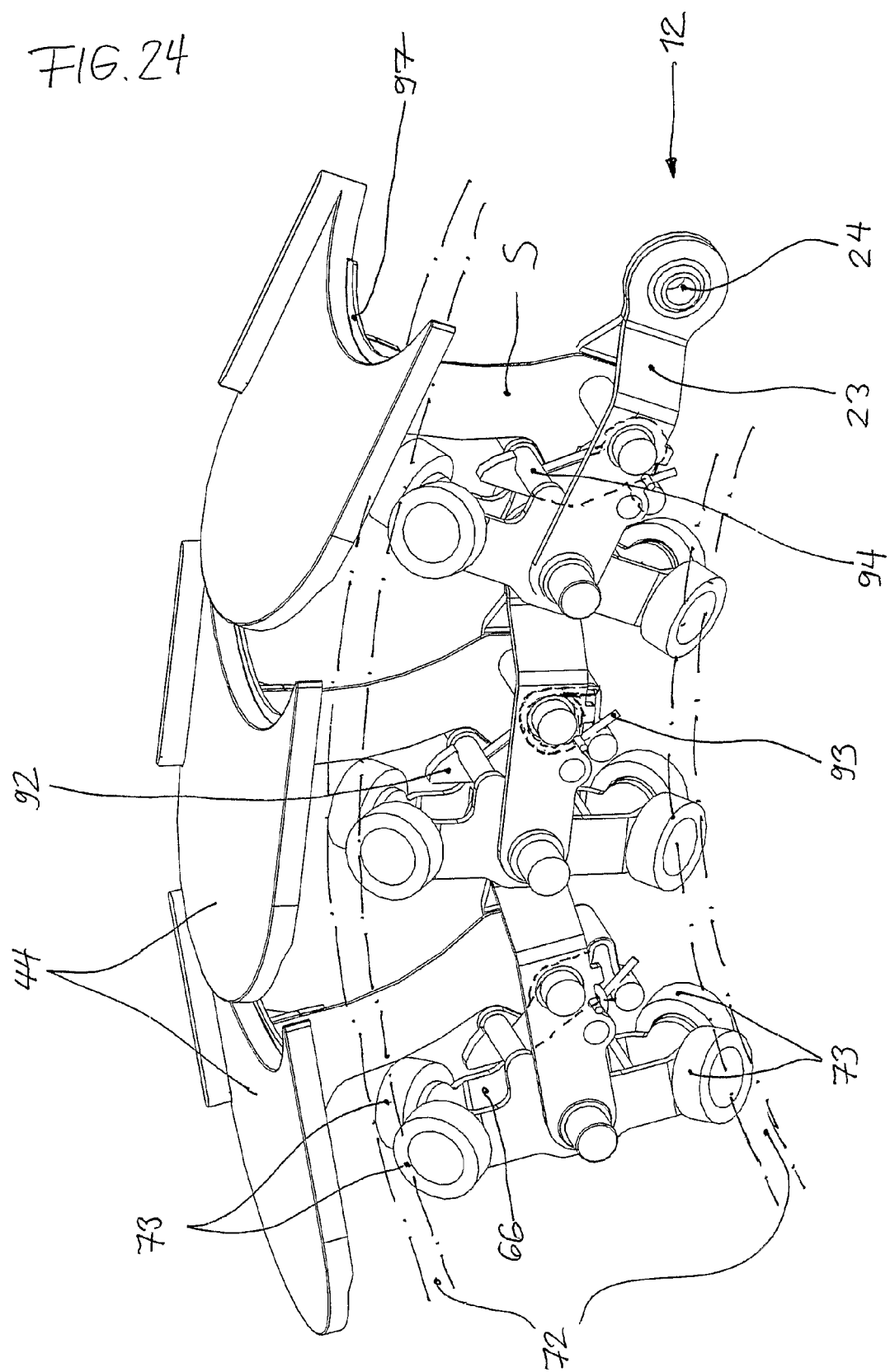
FIGS. 24 and 25 show perspective views of a different embodiment of the conveying means
Figure 25:
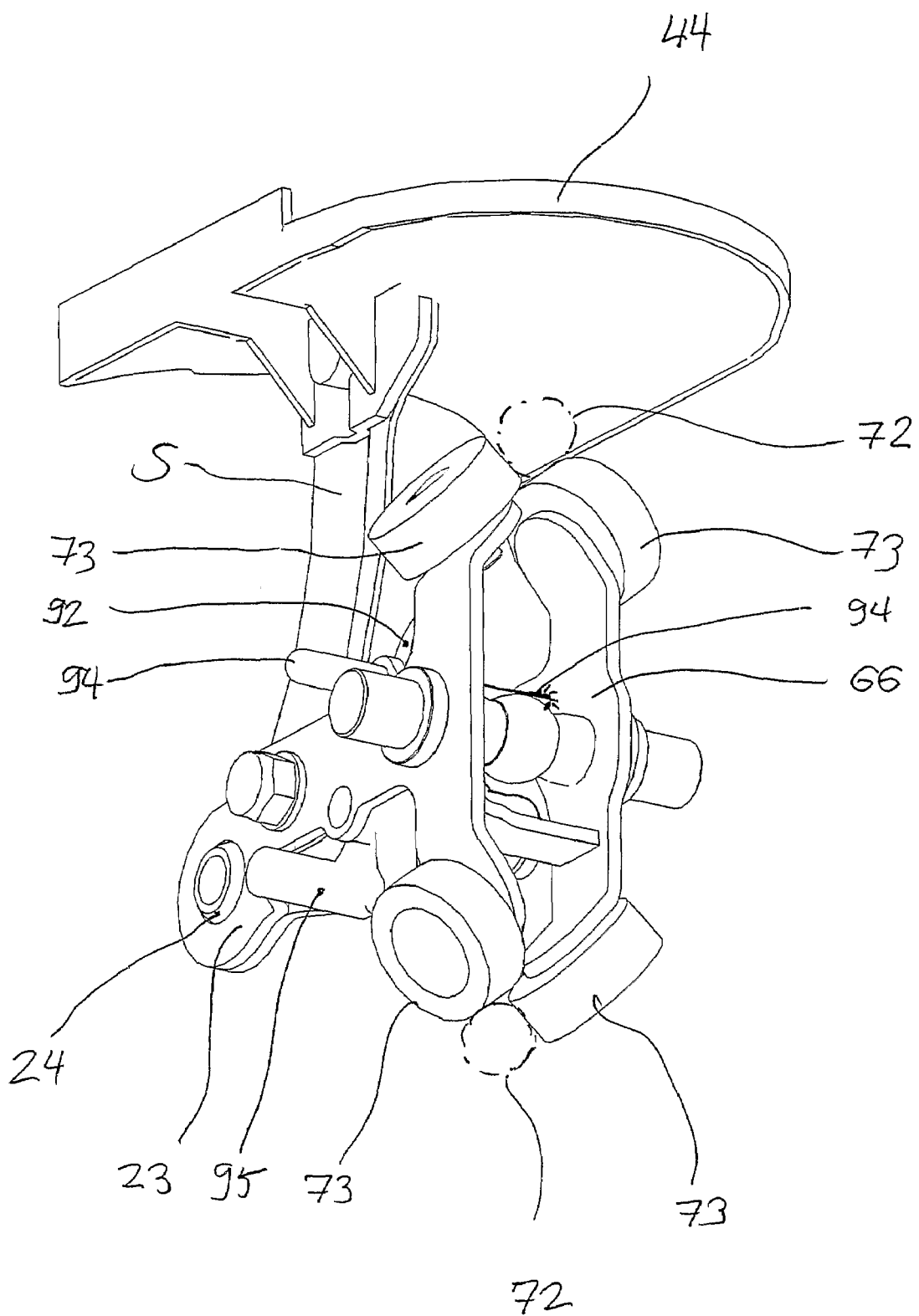
Figure 26:
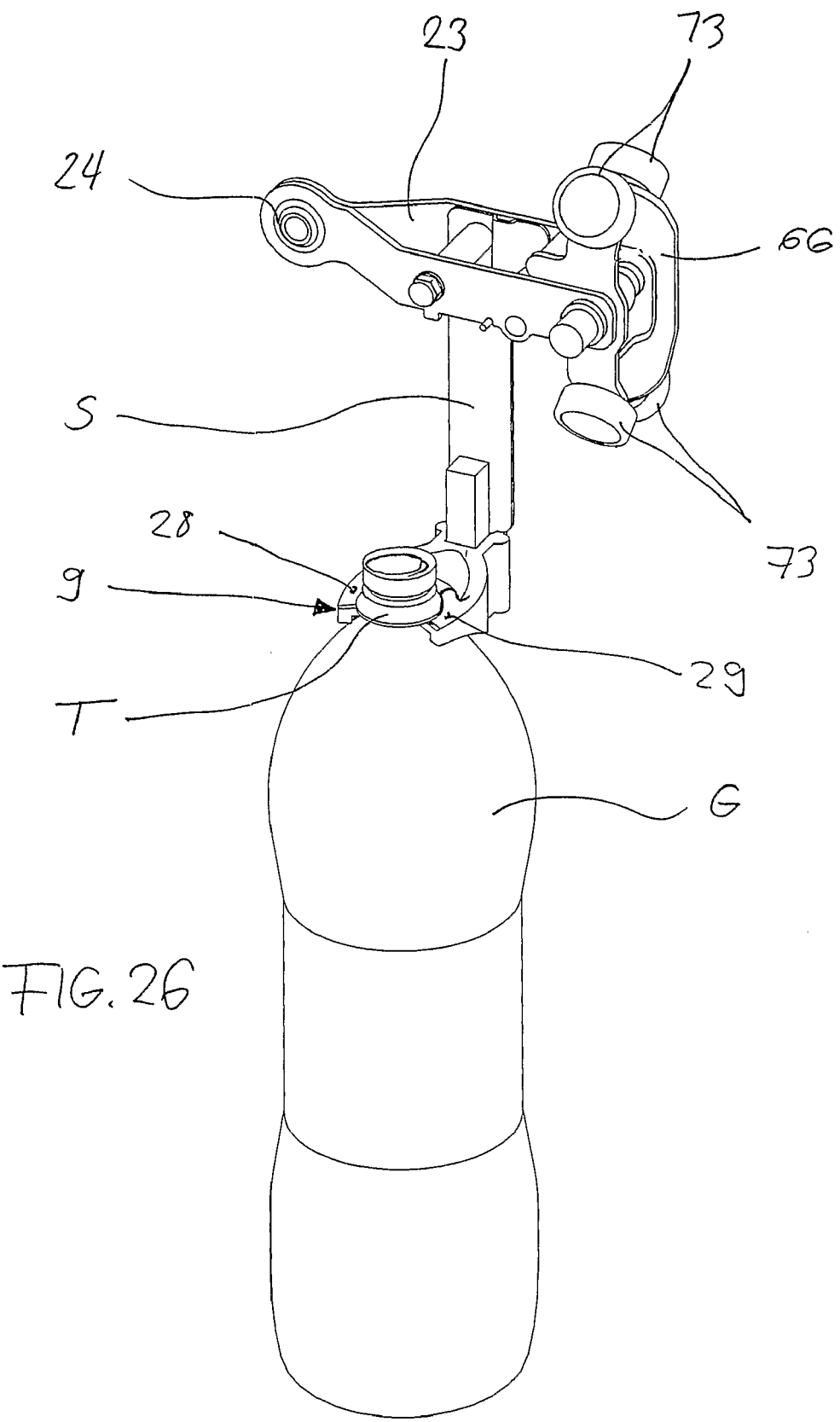
FIG. 26 and 27 show the perspective views of the conveying means according to FIGS. 24 and 25, with different grippers
Figure 27:
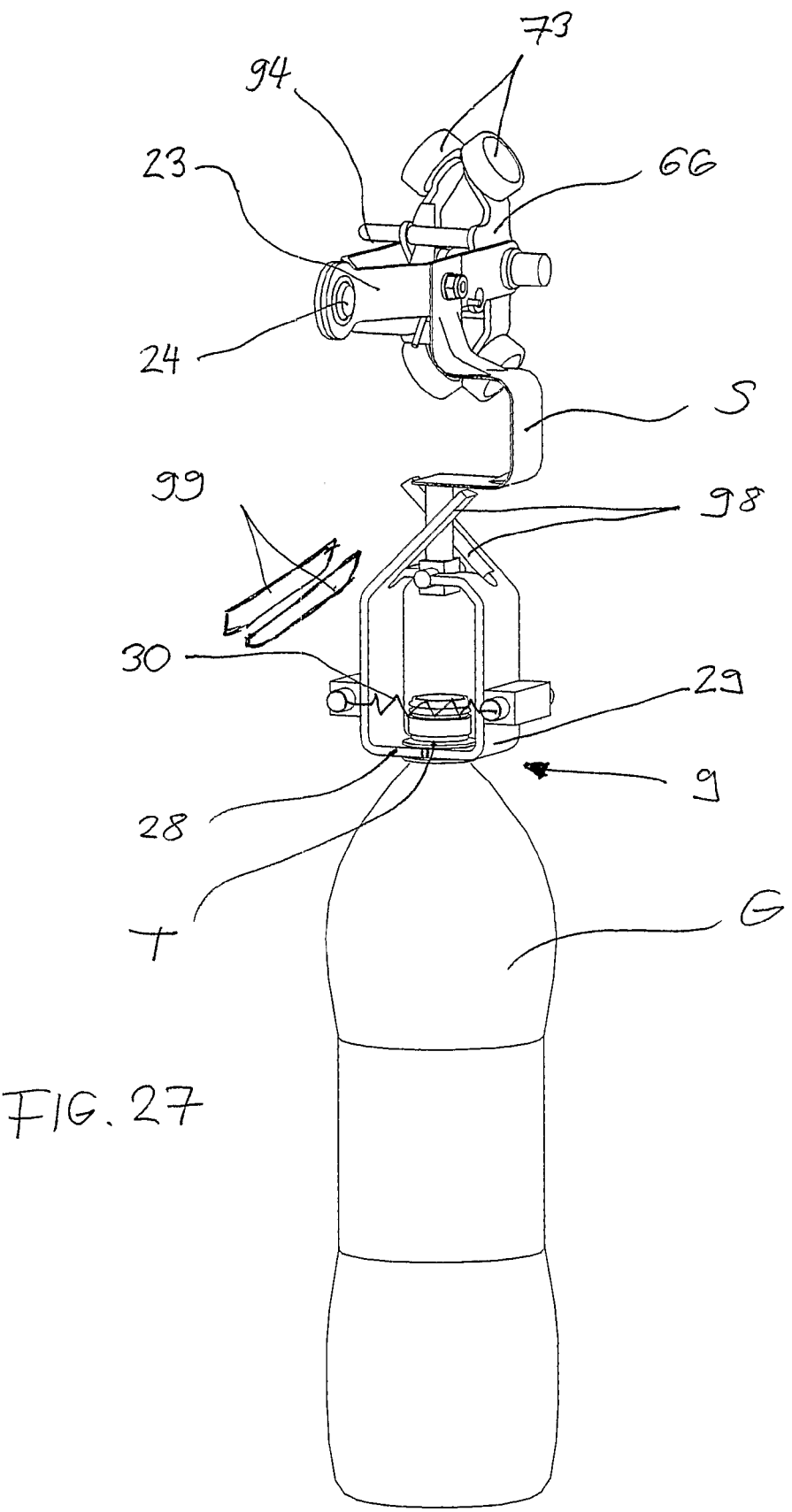

The dynamic storage device according to FIG. 23 differs from the embodiment according to FIG. 2 primarily in that here the middle axes of the coils W of the parallel guide rails 13, 14 are arranged horizontally, resulting in the coils W assuming an essentially vertical position. As a result, the arrangement is particularly space saving. In addition, in the outlet area A, three identical outlet stars 18 are connected to the conveying strand 1a of the flexible conveyor 1, where each of the outlet stars grips every third bottle G. As a result, a triple or multiple track distribution of the bottles G becomes possible.

In the case of the dynamic storage device according to FIG. 23, no separate drive station 7, 8 are provided. Instead, the drive motors MA and ME act directly on the toothed deflection wheels 90, 91 in the area of the input station E and the output station A.

Figure 17:
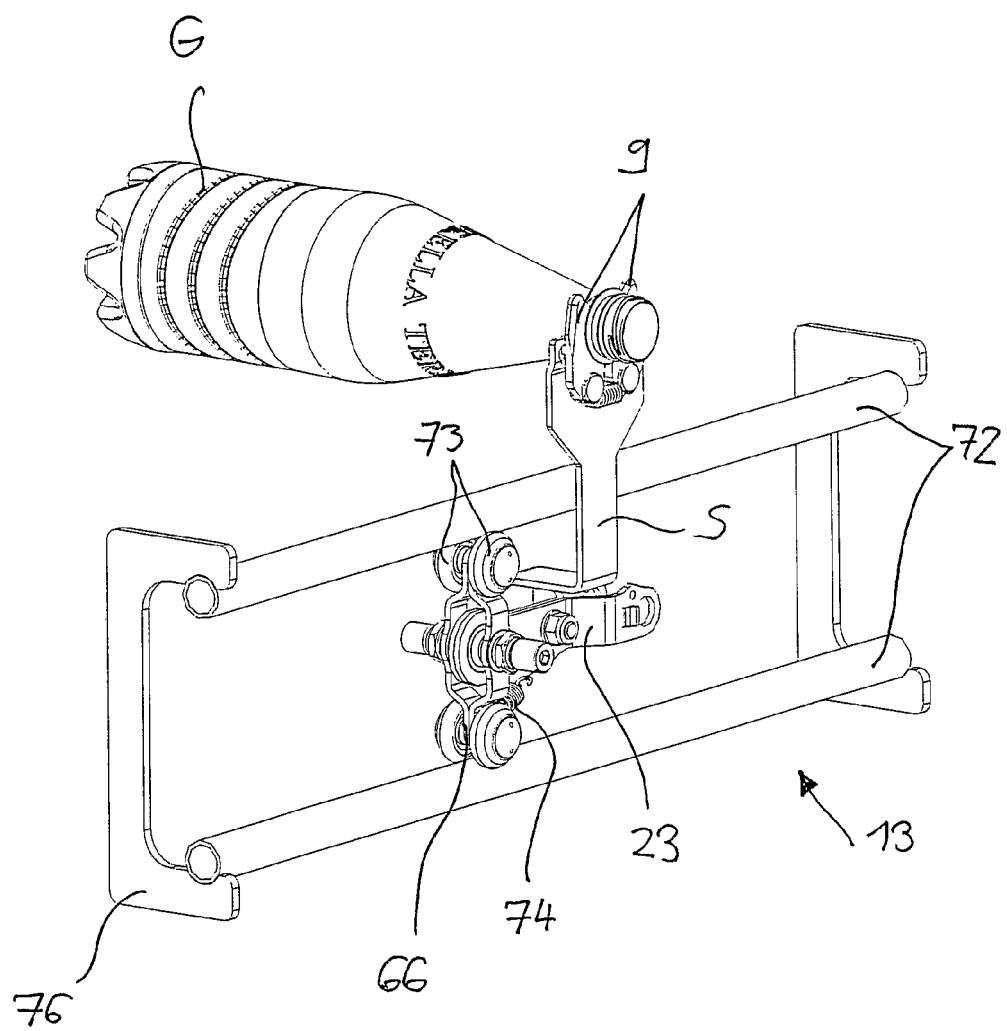
FIG. 17 shows a perspective view of the conveying means according to FIG. 16

The embodiment examples according to FIGS. 24-28 are based partially on the embodiment example according to FIGS. 16, 17 and 18. Here the external guide rail 13 and the internal guide rail 14 are also each constructed from two parallel round rods 72 with spacers 76, which are attached in a stationary frame with columns 46. Here too, each chain link 23 presents two pairs of profiled guide rollers 73, which run on the round rods 72, where the guide rollers 73 on the exterior of the arc are mounted on a double lever 66, which in turn is mounted in a manner which allows pivoting to the chain link 23. The guide rollers 73 in the interior of the arc, however, are not mounted directly on the chain link 23 and thus cannot be pivoted. The guide rollers 73 take over the guidance of the roller chain 12 in the area of the two deflections 3, 4 of the carriage 2 (see FIG. 28).

In the embodiment examples according to FIGS. 24-28, a ratchet 92 is mounted in a manner which allows pivoting on each chain link 23, where the ratchet is prestressed by a torsion spring 93. The pivot axis of the ratchet 92 is parallel to the pivot axis of the double lever 66; the torsion spring 93, in FIG. 24, works clockwise. The ratchet 93 works in cooperation with a transverse peg 94, which is attached parallel to the rotation axis on the double lever 66 projecting on both sides. If the transverse peg 94 is engaged with the ratchet 92, then the double lever 66, together with the chain link which acts as an abutment, is prevented from rotating, and its two guide rollers 73 are engaged with the round rod 72. This position, in which the double lever is substantially vertical to the round rods, is interrupted only at the time of the pass through the first deflection 3 and the second deflection 4 in the area of the carriage 2.

For this purpose, a control cam 95 is provided on the ratchet 92, which cam works in cooperation with the ramp 41 on the carriage 2. If the control cam 95 comes in contact with this ramp 41, then the ratchet 92 is pivoted against the force of the torsion spring 93 (counterclockwise in FIG. 24), it becomes disengaged with the transverse peg 94 thus releasing the double lever 66. The position of the latter is now determined in the area of the carriage 2 by an arc-shaped groove cam 96, which is attached to the carriage. The design here is such that the double lever 66 is pivoted immediately before the arrival at the deflection 3 or 4, respectively, by a sufficient distance so that its two guide rollers 73 can pass between the round rods 72 (position X in FIG. 28). Conversely, immediately after leaving the deflections 3, 4, the double lever 66, after having been passed entirely through the area between the two ground rods 72, is pivoted back into its normal position, in which its two guide rollers 73 again engage "from outside" on the round rods 72, resulting in the ratchet 93 snapping automatically on the transverse peg 94.

In the embodiment examples according to FIGS. 17 and 24-27, in identical situations, a transversely projecting support S is arranged on each chain link 23 consisting of metal sheet and/or plastic. In the embodiment example according to FIG. 17, a gripper 9 according to FIG. 4 is arranged on each support S, where the gripper presents two pivotable gripper arms 28, 29 and a spring 30 which is applied to said arms in the closing sense or gripping sense. In the embodiment example according to FIGS. 24 and 25, a support plate 44 according to FIG. 9 is arranged on each support S, where a projection 97 is also formed on the support plate for mutual bracing. In the embodiment example according to FIG. 26, a gripper 9 is arranged on each support S, where the gripper arms 28, 29 of the gripper constitute a single piece made of elastic plastic. In the embodiment example according to FIG. 27, a gripper 9 is arranged on each support arm S, whose gripper arms 28, 29 are designed for the suspended transport of preferably filled bottles G. The gripper arms 28, 29 enclose the bottle neck below the support ring T almost completely, thus ensuring a stable securing of the bottle G. The gripper arms are provided on the other side of their pivot axis with counter arms 98, by means of which they can be forced open by stationary control cams 99, against the force of the spring 30 in the area of the input station E and the output station A.

By means of the grippers 9 according to FIGS. 4, 17, 26 and 27, which all enclose the bottle neck at least partially, the bottles G are fixed with friction lock and positive lock, and centered. The bottles G thus maintain their precise position with respect to the roller chain 12 as they pass through the dynamic buffer.

The carriage 2 according to FIG. 28, like the carriage 2 according to FIG. 22, is guided in a movable manner by means of several track rollers 35 on the total of four round rods 72 of the external guide rail 13 and the internal guide rail 14. Besides the already described ramp 41 for controlling the ratchet 92 and the groove cam 96 for controlling the double lever 66, the carriage presents two guide arcs 100 which define the first and second deflection 3, 4 and which work in cooperation with the guide rollers 73 which are mounted directly on the chain links 23 and in such a manner that they deflect the roller chain 12 exclusively by roller friction. The guide arcs 100 engage on the opposing sides of the guide rollers 73, while the sides of the guide rollers 73 which point away from each other work in cooperation with the round rods 72. Thus, an overlapping or impact-free transition of the guide rollers 73 from the round rods 72 to the guide arcs 100, and vice versa, is possible.

The invention claimed is:

1. Device for dynamic storage of objects along a conveying section between an input station and an output station, the device comprising:
   an endless, flexible conveying means which is variably subdivided into a conveying strand and an idle strand, the conveying strand and the idle strand each having areas of variable lengths which move in opposite direction,
   at least one carriage which can be moved in a plane of conveyance of the objects for changing the storage capacity of the device, the carriage having a first deflection for the conveying strand and a second deflection for the idle strand,
   a first drive device for the conveying means disposed in the area of the input station and a second drive device for the conveying means disposed in the area of the output station, the first drive device and the second drive device being driven independently of each other with variable speed of conveyance and the endless, flexible conveying means being provided over its entire length at equal intervals with grippers for the objects,
   wherein the conveying means includes a link chain, equipped with rotatable guide rollers and which runs at least in some areas in at least one stationary guide rail,
   wherein the link chain includes a plurality of chain links and wherein at least one rotatable guide roller is arranged movably on the respective chain links,
   wherein the rotatable guide roller is connected by articulation to the respective chain link by means of a pivoted lever,
   wherein the pivoted lever can be fixed, in the position in which the movable guide roller is engaged with the stationary guide rail, to the respective chain link in such a manner that it can be detached, and
   wherein the pivoted lever can be reset by means of a control device between the position in which the guide roller engages the stationary guide rail and a position which is pivoted with respect to the former position.

2. Device according to claim 1, wherein the grippers include elastic passive gripping pliers, which fix the objects on the conveying means.

3. Device according to claim 1, wherein the grippers include controllable active gripping pliers, which fix the objects on the conveying means.

4. Device according to claim 1, wherein the grippers are adapted to grip the bottles under a thickened region provided heads of the bottles.

5. Device according to claim 1, wherein the grippers grip the objects with positive lock.

6. Device according to claim 1, wherein the grippers are arranged rigidly on the conveying means.

7. Device according to claim 1, wherein the grippers are arranged movably on the conveying means.

8. Device according to claim 7, wherein two or more grippers re combined to form a structural unit, with the structural unit arranged in a pivotable manner on the conveying means, such that when the structural unit is in a first position, a connection line between the grippers of the structural unit is substantially parallel to the conveying means and, when the structural unit is in a second position, the connection line is substantially transverse to the conveying means.

9. Device according to claim 8, wherein the position of the structural unit is controllable such that in the area of the input station and the output station, the connection line is substantially parallel to the conveying means and in intermediate areas, the connection line is substantially transverse to the conveying means.

10. Device according to claim 8, wherein the structural unit is arranged in a pivotal manner on extension arms.

11. Device according to claim 1, wherein the link chain, in the area where the carriage moves, runs in parallel, on two stationary guide rails.

12. Device according to claim 11, wherein the parallel guide rails, at least in the area in which the carriage moves, present a curve-shape.

13. Device according to claim 12, wherein a middle axis of the curve-shape is arranged one of substantially horizontally or substantially vertically.

14. Device according to claim 12, wherein the curve shape is one of circular, oval, spiral or coil shape.

15. Device according to claim 1, wherein the rotatable guide roller is impinged by a spring element which tends to keep the guide roller engaged with the stationary guide rail.

16. Device according to claim 1, wherein the movable guide roller is mounted by means of at least one bolt to the respective chain link in such a manner that it can be shifted parallel to the rotation axis.

17. Device according to claim 1, wherein the movable guide roller is coupled to a thrust block which can be impinged by the carriage.

18. Device according to claim 1, wherein the carriage has two guide arcs, curved in opposite directions, for the link chain, where end areas of the two guide arcs correspond to the guide rails and engage or disengage the link chain with or from the guide rails.

19. Device according to claim 18, wherein the guide arcs present in their end areas one of slanted ramps or wedges working in cooperation with one of guide rollers or thrust blocks.

20. Device according to claim 18, wherein the respective first and second deflections or the guide arcs are each arranged on a common frame in a manner which allows pivoting and provided with track rollers which engage on the guide rails.

21. Device according to claim 1, wherein on the idle strand of the flexible conveying means, at least one elastically prestressed tension element engages.

22. Device according to claim 1, wherein the guide rails for the link chain include two parallel round rods.

23. Device according to claim 1, wherein the guide rails for the roller chain each present two parallel round rods.

24. Device according to claim 1, wherein the grippers grip the objects with a friction lock.

25. Device for dynamic storage of objects along a conveying section between an input station and an output station, the device comprising:
   an endless, flexible conveying means which is variably subdivided into a conveying strand and an idle strand, the conveying strand and the idle strand each having areas of variable lengths which move in opposite direction,
   at least one carriage which can be moved in a plane of conveyance of the objects for changing the storage capacity of the device, the carriage having a first deflection for the conveying strand and a second deflection for the idle strand,
   a first drive device for the conveying means disposed in the area of the input station and a second drive device for the conveying means disposed in the area of the output station, the first drive device and the second drive device being driven independently of each other with variable speed of conveyance and the endless, flexible conveying means being provided over its entire length at equal intervals with grippers for the objects,
   wherein the conveying means includes a link chain, equipped with rotatable guide rollers and which runs at least in some areas in at least one stationary guide rail,
   wherein the link chain includes a plurality of chain links and wherein at least one rotatable guide roller is arranged movably on the respective chain links,
   wherein on the respective chain link at least one double lever is pivotally mounted, and wherein the double lever carries guide rollers at both ends.

26. Device according to claim 25, wherein the pivotable double lever can be fixed to the chain link by means of a ratchet arranged on the chain link.

27. Device for dynamic storage of objects along a conveying section between an entry station and an exit station, the device comprising:
   an endless, flexible conveying means variably subdivided into a conveying strand and an idle strand, where the conveying strand and the idle strand each present areas with variable length, which can be moved in opposite directions,
   at least one carriage, which can be moved in a plane of conveyance of the conveying means, for changing the storage capacity, the carriage having a first deflection for the conveying strand and a second deflection for the idle strand,
   a first drive device for the conveying means in the area of the input station and a second drive device for the conveying means in the area of the output station, the first drive device and the second drive device being driven independently of each other with variable speed of conveyance,
   the conveying means having a link chain including a plurality of chain links, the link chain equipped with rotatable guide rollers and running at least in some areas in at least one stationary guide rail, and with at least one guide roller arranged in a movable manner on the respective chain links,
   wherein the movable guide rollers are connected by articulation to the respective chain links by means of a pivoted lever,
   wherein the pivoted lever, in a position in which the movable guide roller is engaged with the stationary guide rail, is adapted to be fixed in a detachable manner on the respective chain links, and
   wherein the pivoted lever can be reset by means of a control device between the position in which the guide roller engages on a stationary guide rail and a position which is pivoted with respect to the former position.

28. Device according to claim 27, wherein the movable guide roller is impinged by a spring element tending to keep the guide roller engaged with the stationary guide rail.

29. Device according to claim 27, wherein the movable guide roller is mounted by means of at least one bolt to the respective chain links in such a manner that it can be shifted parallel to the rotation axis.

30. Device according to claim 27, wherein the movable guide roller is coupled with a thrust block which can be impinged by the carriage.

31. Device according to claim 27, wherein the carriage has guide arcs, curved in opposite directions, for the link chain, the guide arcs having end areas corresponding with the guide rails and engaging or disengaging the link chain with or from the guide rails.

32. Device according to claim 31, wherein the guide arcs have in their end areas one of slanted ramps or wedges which work in cooperation with one of guide rollers, or thrust blocks, or ratchets.

33. Device according to claim 31, wherein the two deflections and guide arcs are each arranged on a common frame in such a manner that they can be pivoted and provided with track rollers which engage on the guide rails.

34. Device according to claim 27, wherein at least one elastically prestressed tension element engages on the idle strand of the flexible conveying means.

35. Device according to claim 27, wherein the pivoted lever is fixed in a detachable manner on the respective chain link by means of one of a snap-on connection or a ratchet.

36. Device for dynamic storage of objects along a conveying section between an entry station and an exit station, the device comprising:
an endless, flexible conveying means variably subdivided into a conveying strand and an idle strand, where the conveying strand and the idle strand each present areas with variable length, which can be moved in opposite directions,
at least one carriage, which can be moved in a plane of conveyance of the conveying means, for changing the storage capacity, the carriage having a first deflection for the conveying strand and a second deflection for the idle strand,
a first drive device for the conveying means in the area of the input station and a second drive device for the conveying means in the area of the output station, the first drive device and the second drive device being driven independently of each other with variable speed of conveyance,
the conveying means having a link chain including a plurality of chain links, the link chain equipped with rotatable guide rollers and running at least in some areas in at least one stationary guide rail, and with at least one guide roller arranged in a movable manner on the respective chain links,
wherein on the respective chain link, two double levers can be pivoted in a scissor-like manner with the levers carrying guide rollers on both ends.

37. Link chain equipped with rotatable guide rollers for a device for dynamic storage of objects along a conveying section between an input station and an output station, the device for the dynamic storage of objects including an endless, flexible conveying means which is variably subdivided into a conveying strand and an idle strand, the conveying strand and the idle strand each having areas of variable lengths which can be moved in opposite directions, at least one carriage which can be moved in the plane of conveyance for changing the storage capacity, the carriage having a first deflection for the conveying strand and a second deflection for the idle strand, a first drive device for the conveying means in the area of the input station and a second drive device for the conveying means in the area of the output station, the first drive device and the second drive device being driven independently of each other with variable speed of conveyance and the endless, flexible conveying means being provided over its entire length at equal intervals with grippers for the objects, the link chain comprising:
a plurality of chain links; and
at least one guide roller movably arranged on the respective chain links,
wherein the movable guide roller is attached by articulation to the respective chain link by means of a pivoted lever,
wherein the pivoted lever, in the position in which the movable guide roller is engaged with a stationary guide rail, can be fixed to the respective chain link in a detachable manner, and
wherein the pivoted lever can be reset by means of a control device between the position in which the guide roller engages on a stationary guide rail and a position which is pivoted with respect to the former position.

38. Link chain according to claim 37, wherein the movable guide roller is impinged by a spring element.

39. Link chain according to claim 37, wherein the movable guide roller is mounted by means of at least one bolt to the respective chain link in such a manner that it can be shifted parallel to the rotation axis.

40. Link chain according to claim 37, wherein the movable guide roller is coupled with a thrust block.

41. Link chain equipped with rotatable guide rollers for a device for dynamic storage of objects along a conveying section between an input station and an output station, the device for the dynamic storage of objects including an endless, flexible conveying means which is variably subdivided into a conveying strand and an idle strand, the conveying strand and the idle strand each having areas of variable lengths which can be moved in opposite directions, at least one carriage which can be moved in the plane of conveyance for changing the storage capacity, the carriage having a first deflection for the conveying strand and a second deflection for the idle strand, a first drive device for the conveying means in the area of the input station and a second drive device for the conveying means in the area of the output station, the first drive device and the second drive device being driven independently of each other with variable speed of conveyance and the endless, flexible conveying means being provided over its entire length at equal intervals with grippers for the objects, the link chain comprising:
a plurality of chain links; and
at least one guide roller movably arranged on the respective chain links,
wherein, on the respective chain link, at least one double lever is mounted in a manner which allows pivoting, where the lever carries guide rollers on both ends.

42. Link chain according to claim 41, wherein the double lever can be attached by means of one of a snap-on connection or a ratchet to the respective chain link in a detachable manner.

43. Link chain equipped with rotatable guide rollers for a device for dynamic storage of objects along a conveying section between an input station and an output station, the device for the dynamic storage of objects including an endless, flexible conveying means which is variably subdivided into a conveying strand and an idle strand, the conveying strand and the idle strand each having areas of variable lengths which can be moved in opposite directions, at least one carriage which can be moved in the plane of conveyance for changing the storage capacity, the carriage having a first deflection for the conveying strand and a second deflection for the idle strand, a first drive device for the conveying means in the area of the input station and a second drive device for the conveying means in the area of the output station, the first drive device and the second drive device being driven independently of each other with variable speed of conveyance and the endless, flexible conveying means being provided over its entire length at equal intervals with grippers for the objects, the link chain comprising:

a plurality of chain links; and
at least one guide roller movably arranged on the respective chain links,
wherein the movable guide roller is attached by articulation to the respective chain link by means of a pivoted lever,
wherein the pivoted lever can be attached by means of one of a snap-on connection or a ratchet to the respective chain link in a detachable manner.

* * * * *

UNITED STATES PATENT AND TRADEMARK OFFICE
CERTIFICATE OF CORRECTION

| | | |
|---|---|---|
| PATENT NO. | : 7,810,629 B2 | Page 1 of 1 |
| APPLICATION NO. | : 10/588046 | |
| DATED | : October 12, 2010 | |
| INVENTOR(S) | : Volker Kronseder et al. | |

It is certified that error appears in the above-identified patent and that said Letters Patent is hereby corrected as shown below:

In the Claims:

At Column 15, line 4, "re combined" should be -- recombined --.

Signed and Sealed this
Third Day of May, 2011

David J. Kappos
*Director of the United States Patent and Trademark Office*